Nov. 28, 1961 W. A. KETTLER 3,010,377
PHOTOGRAPHIC APPARATUS
Filed June 13, 1956 13 Sheets—Sheet 13
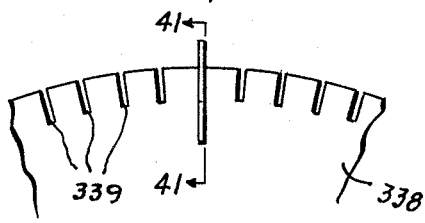
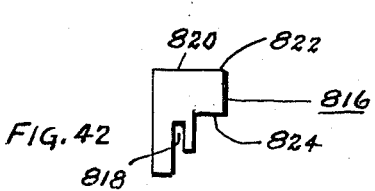
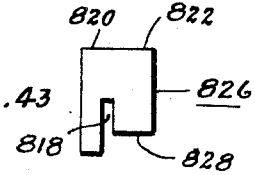
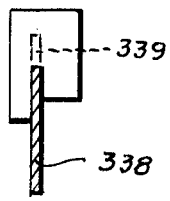
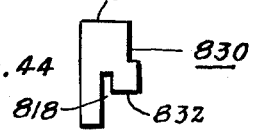
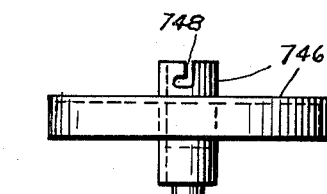
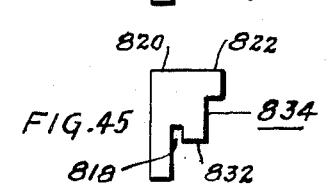
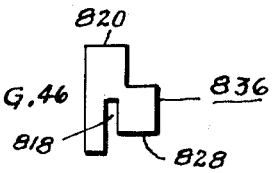
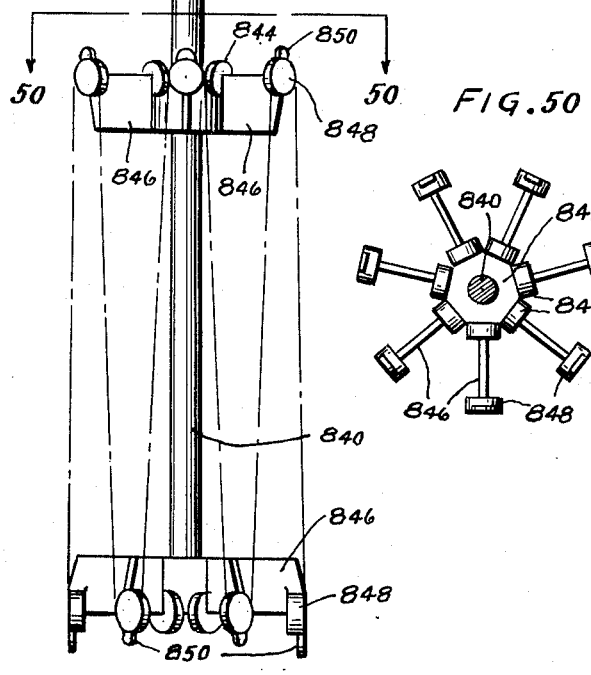
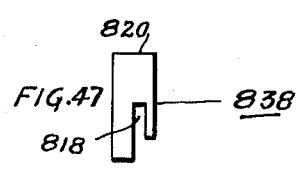
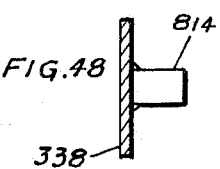
INVENTOR
WILFRED A. KETTLER
BY Ray Eilers ATT'Y.

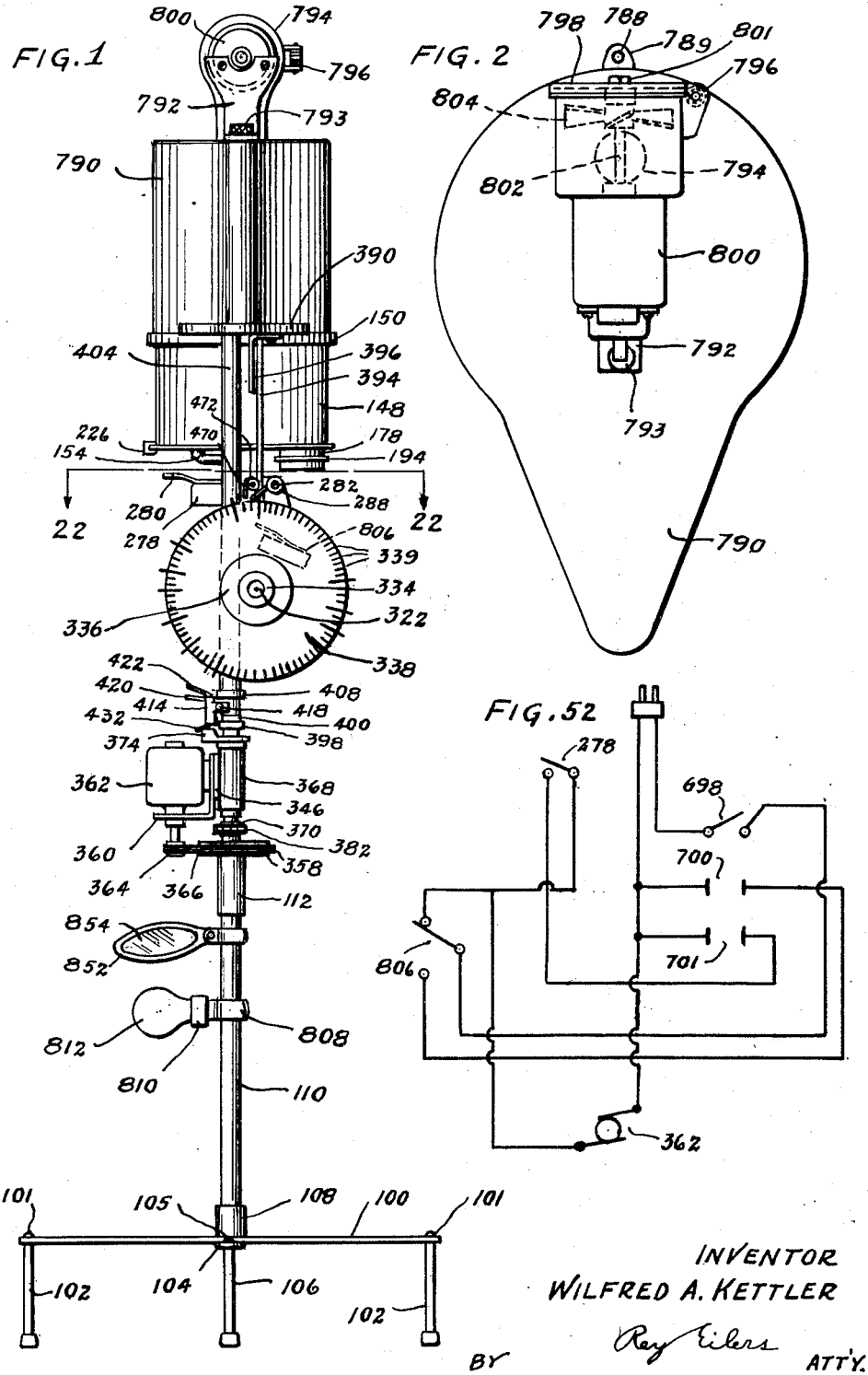

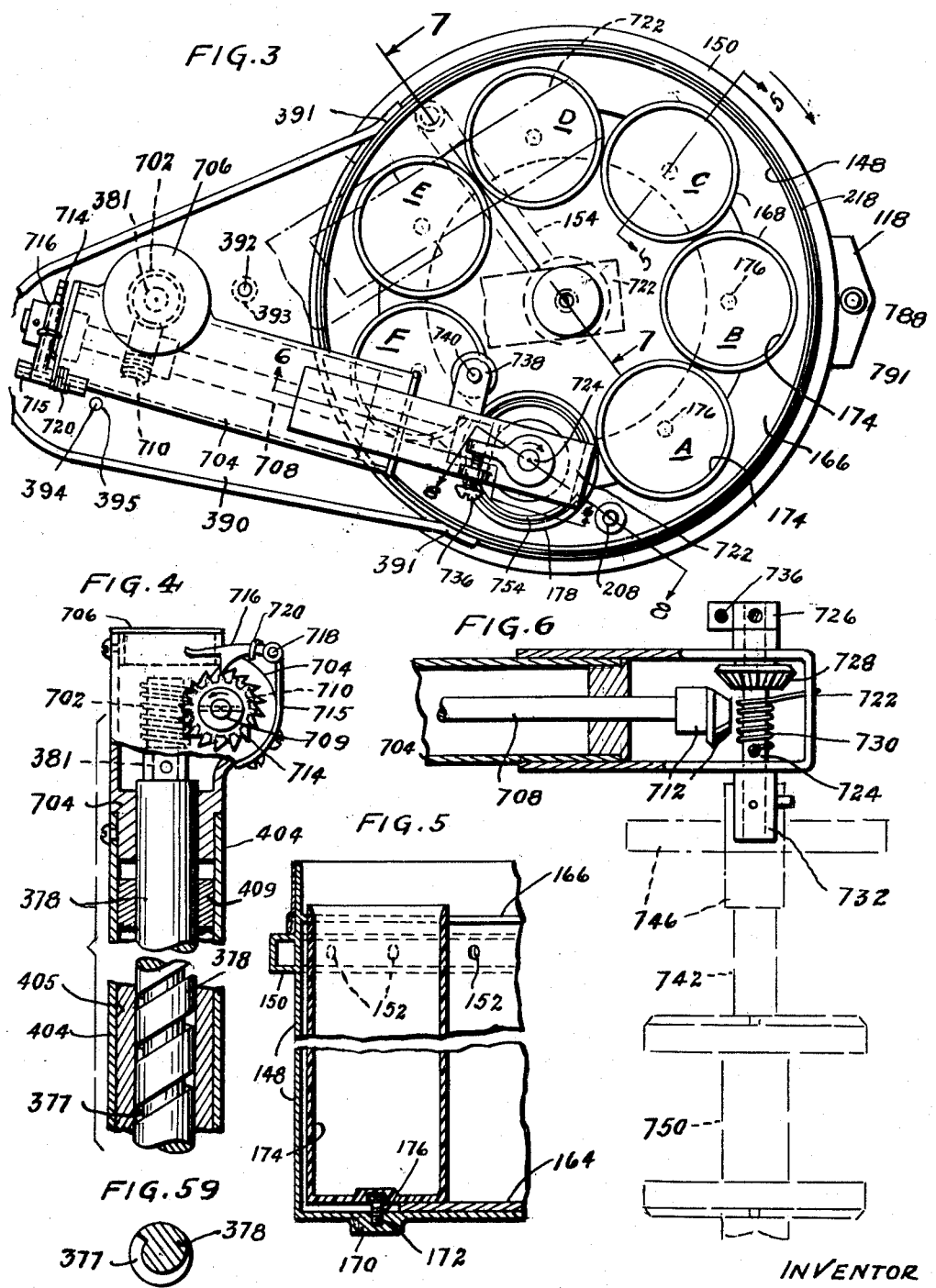

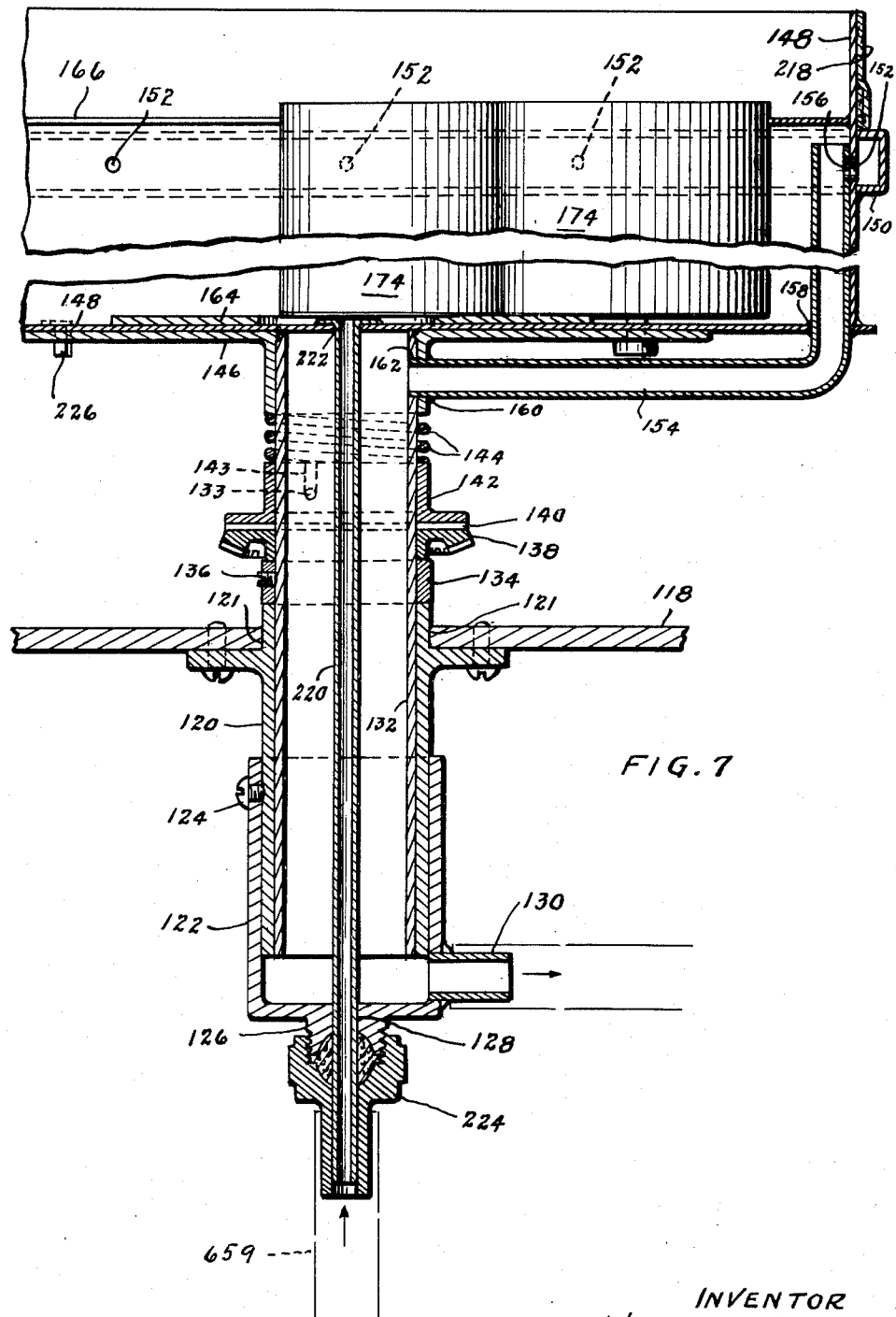

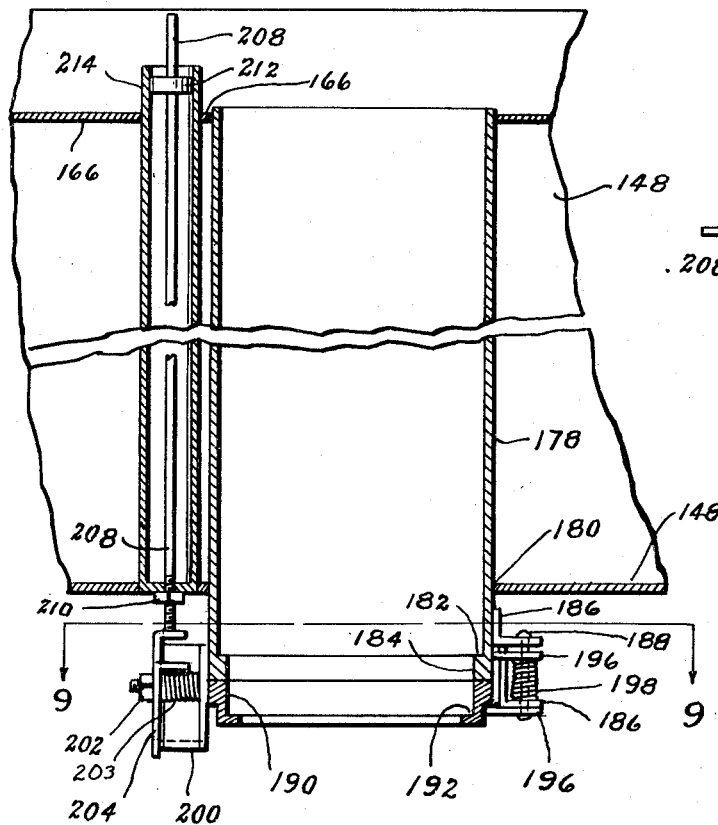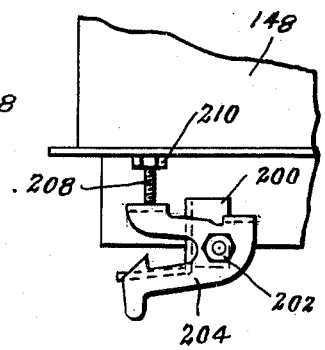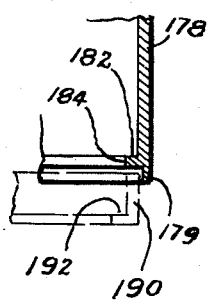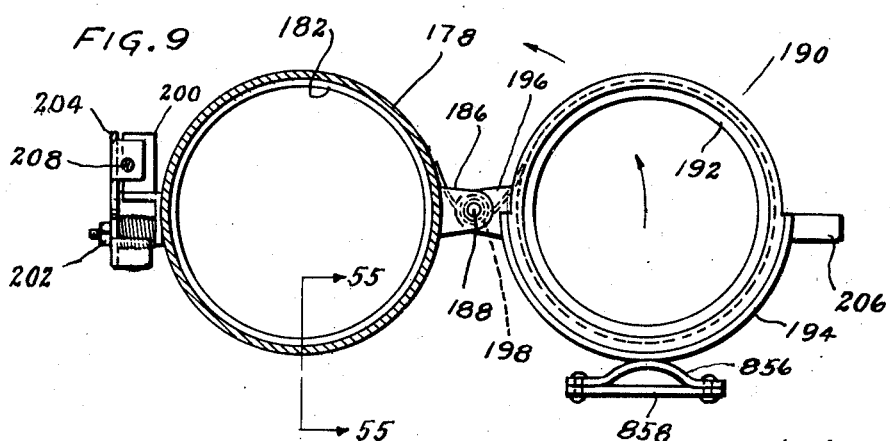

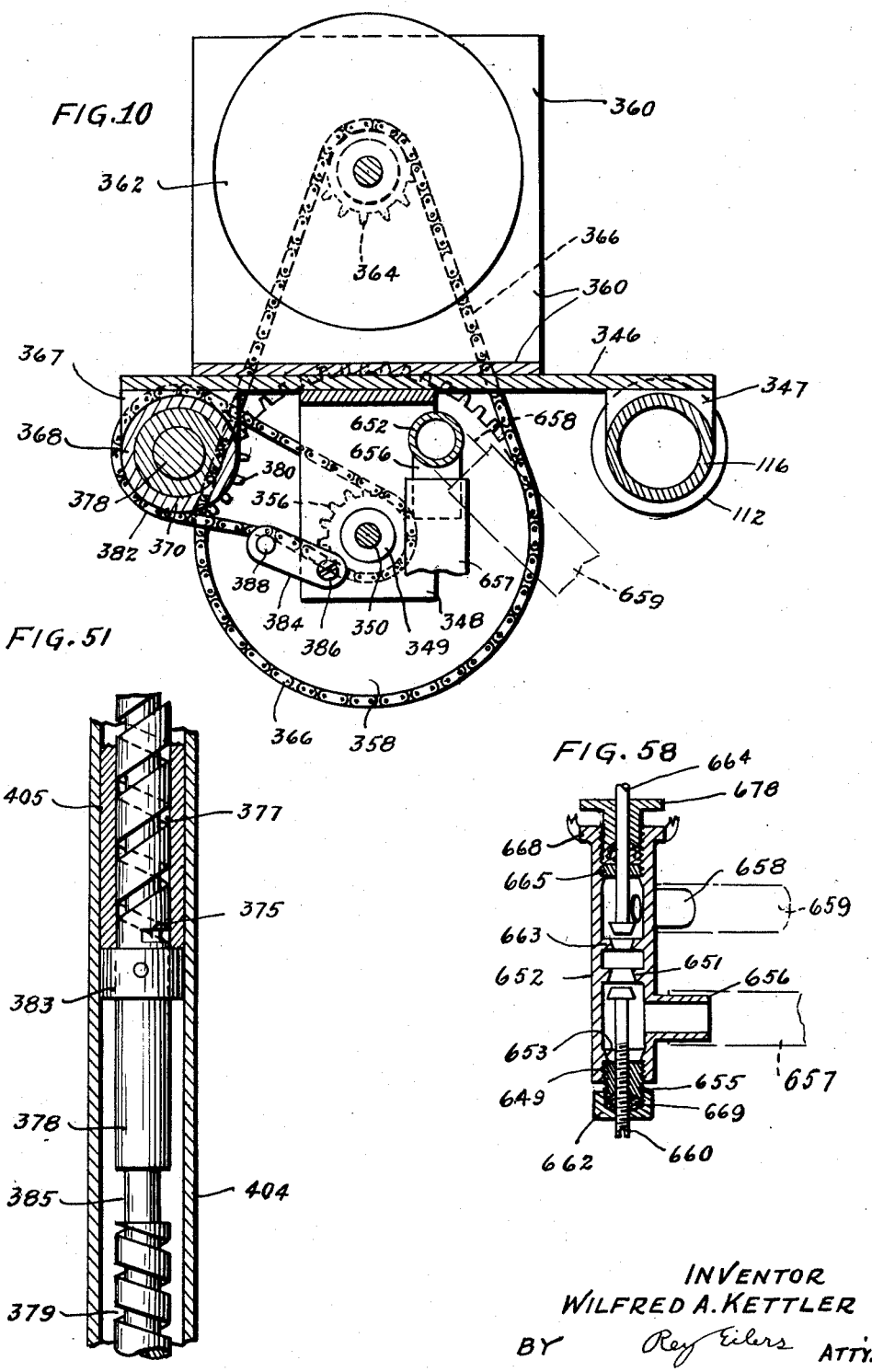

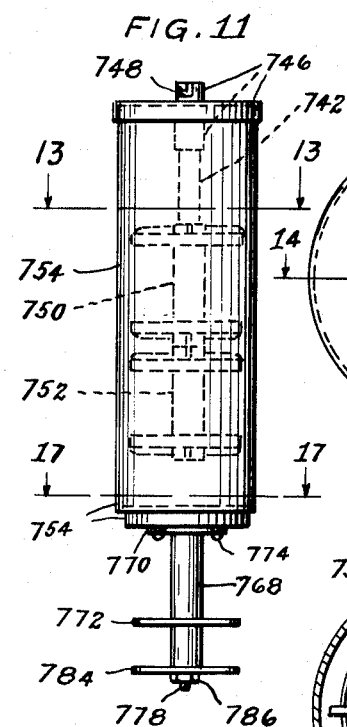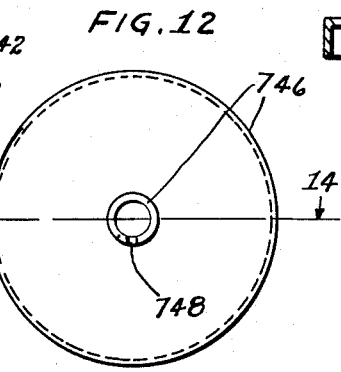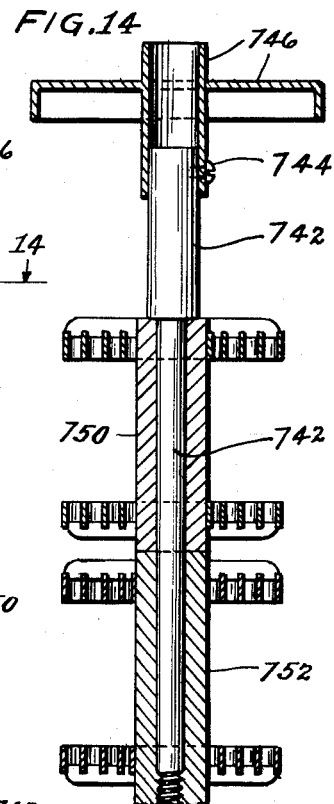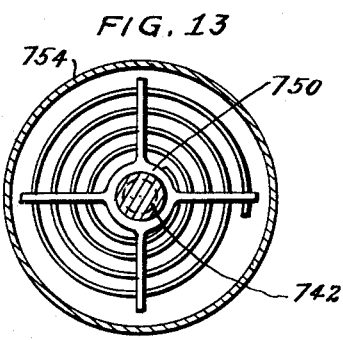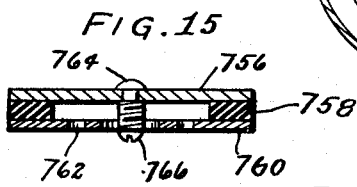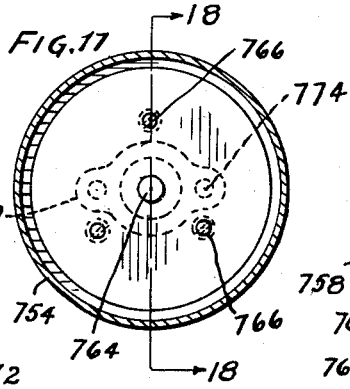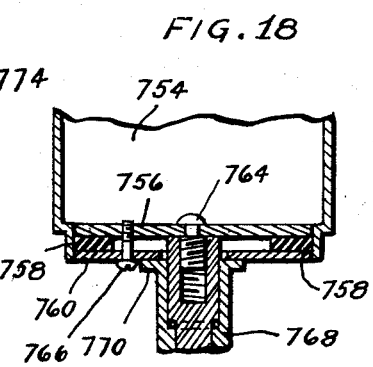

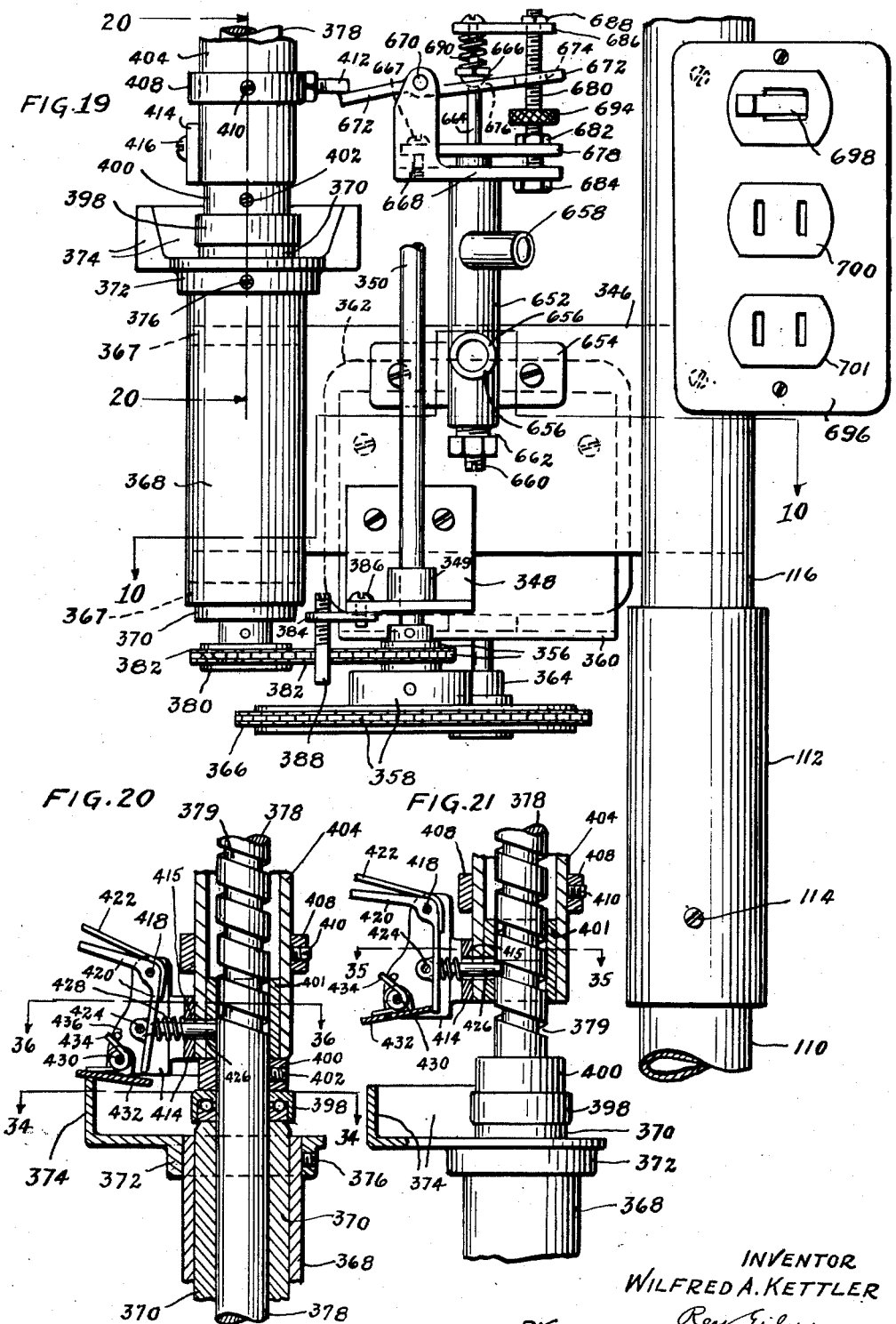

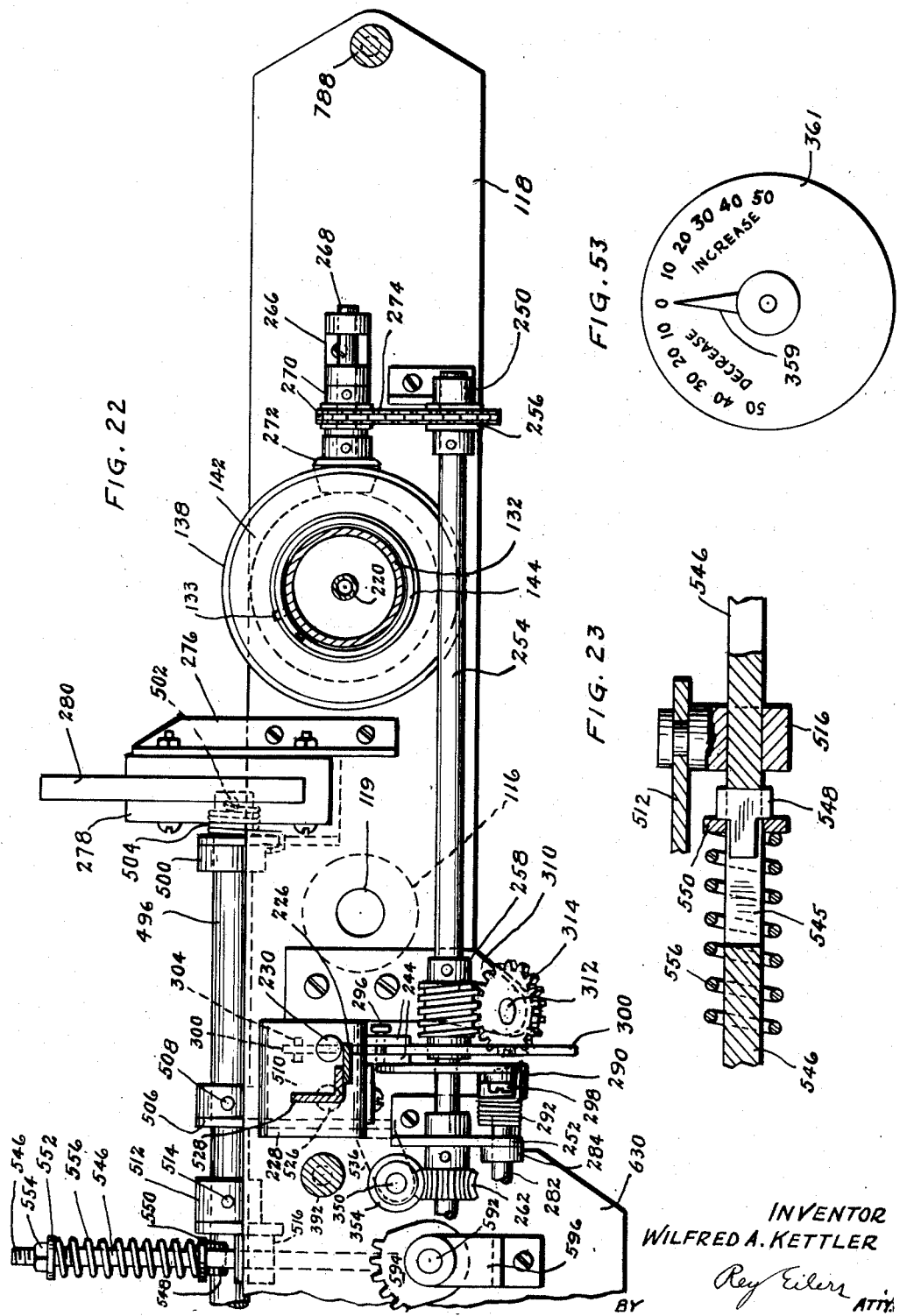

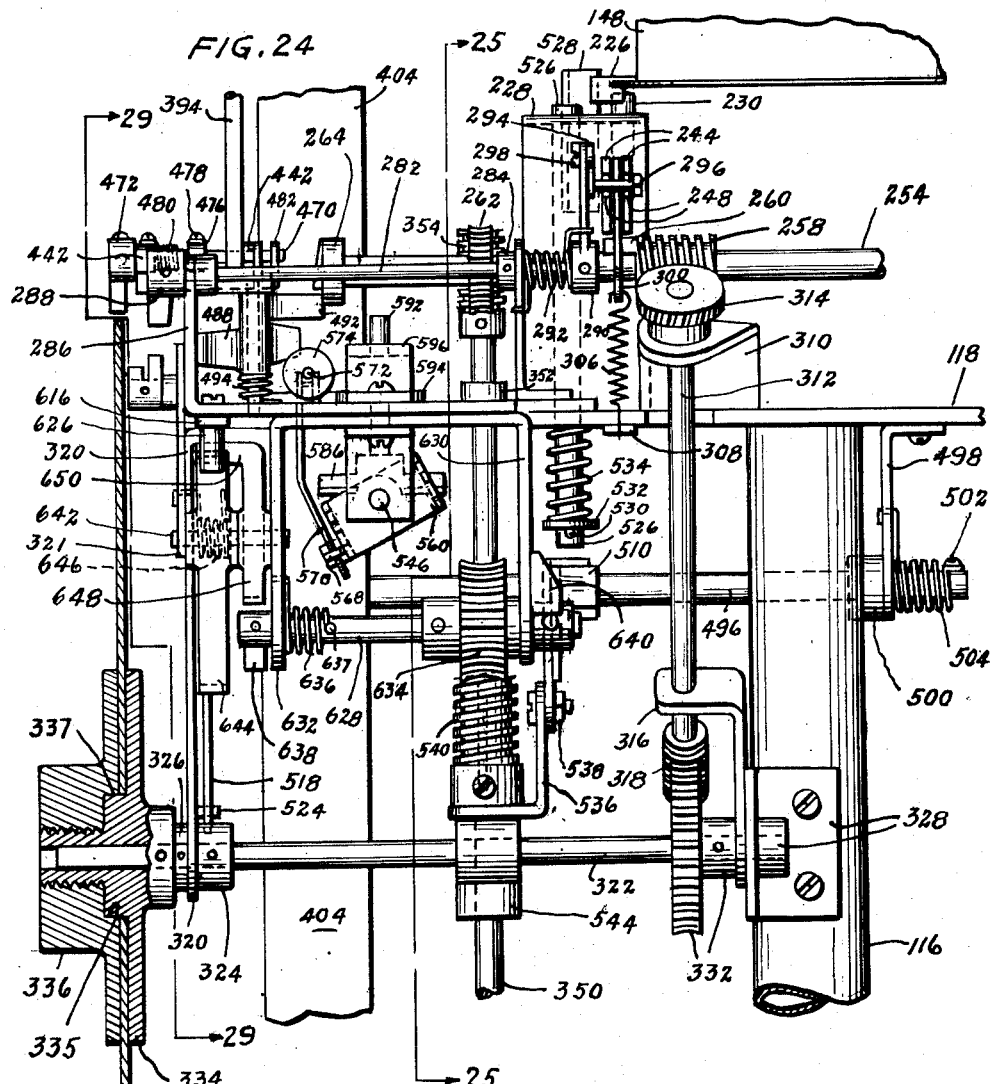
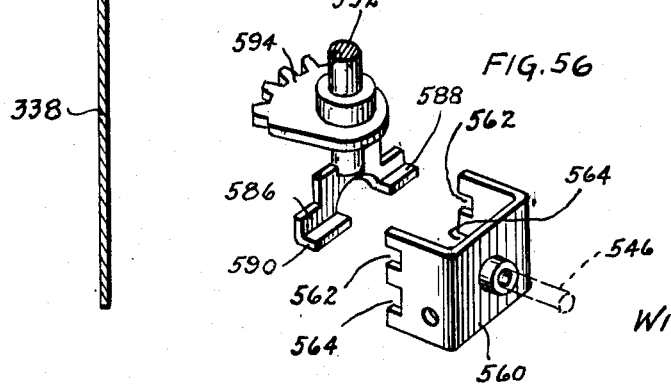
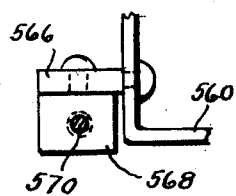

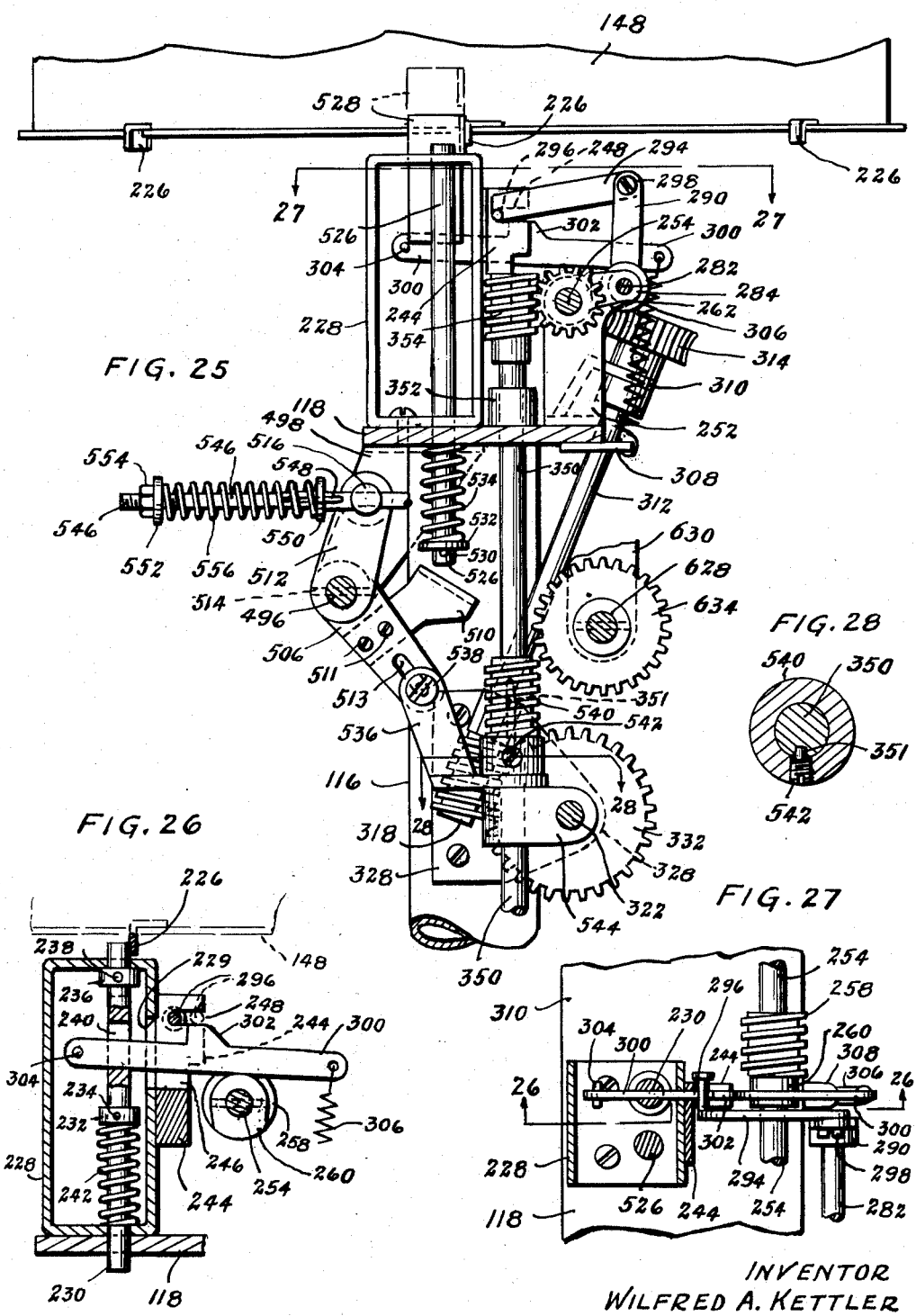

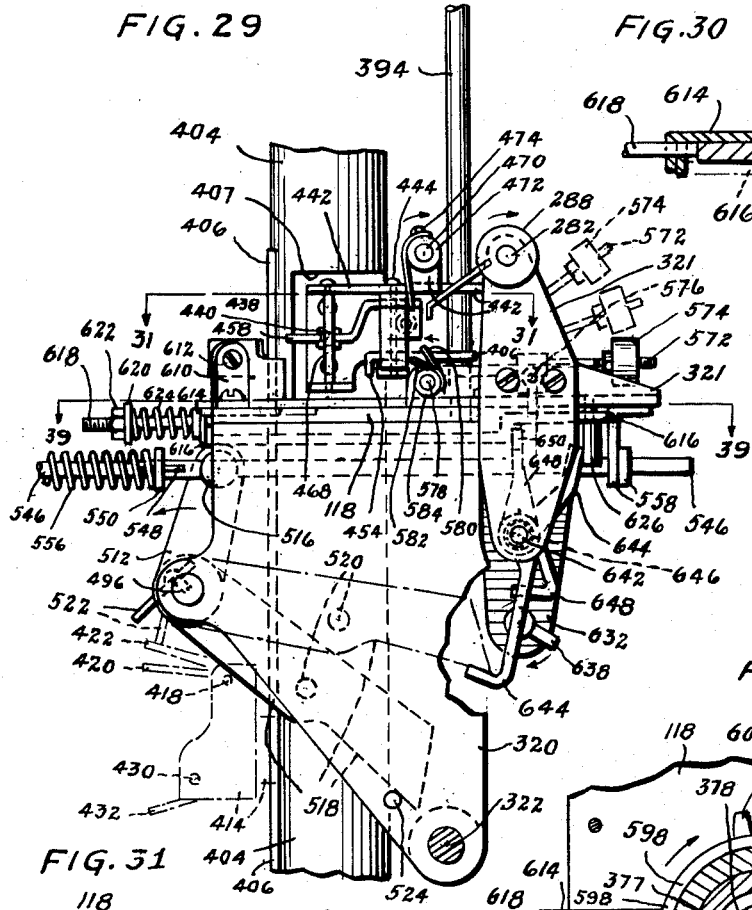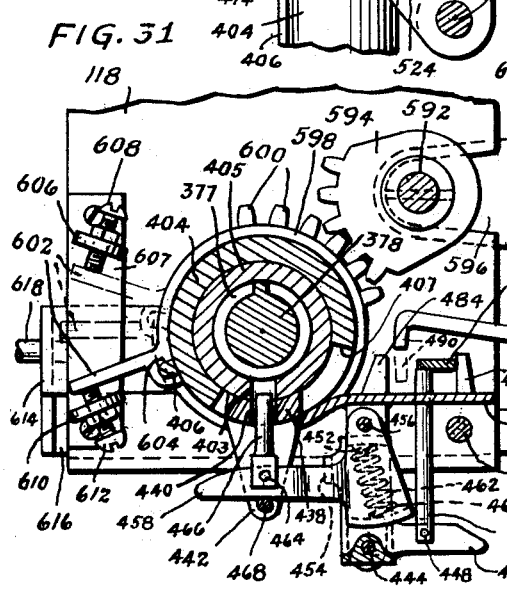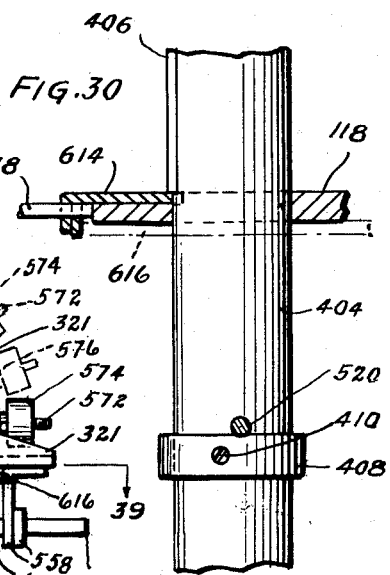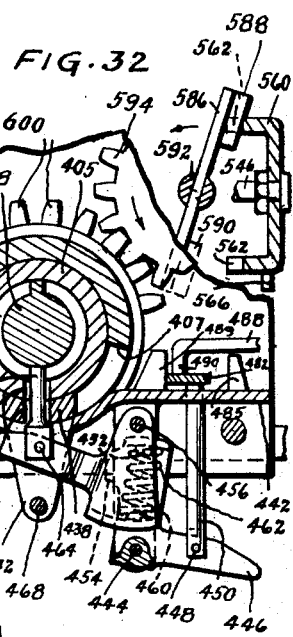

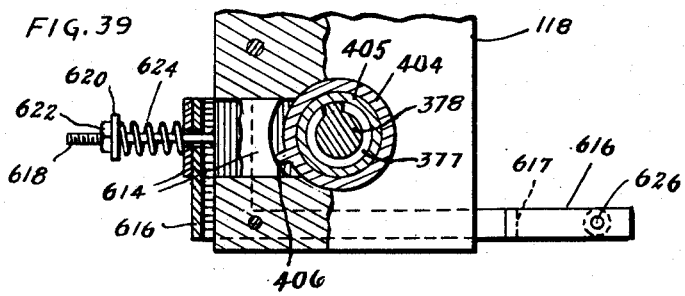
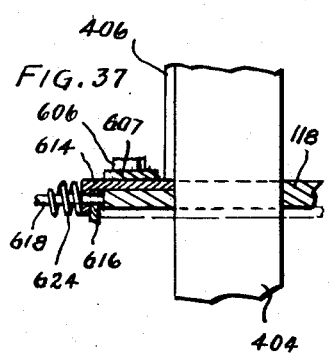
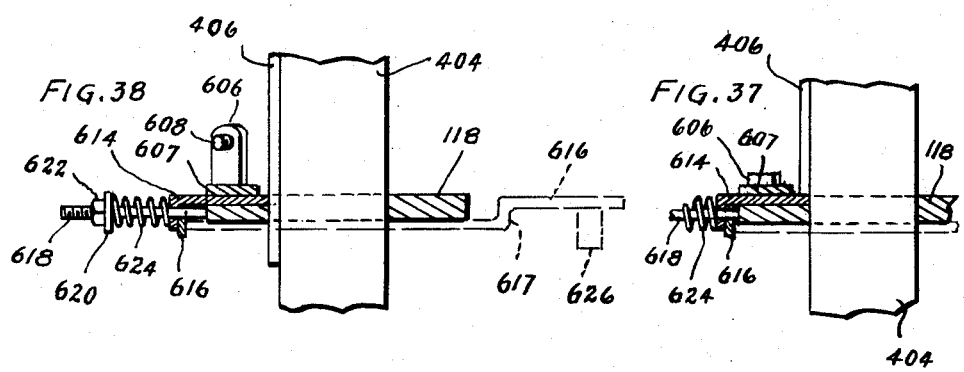
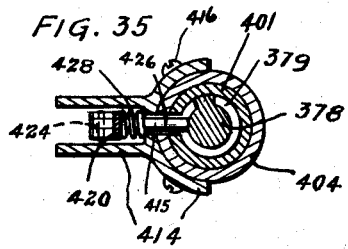
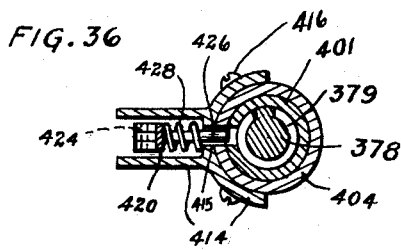
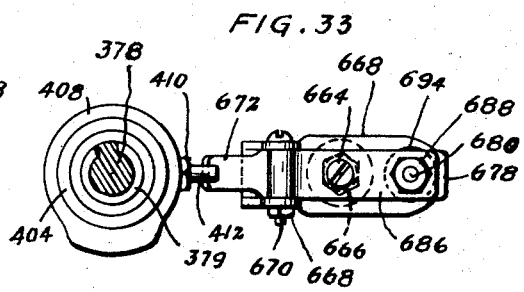
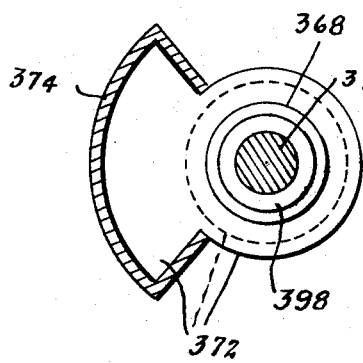

United States Patent Office 3,010,377
Patented Nov. 28, 1961

3,010,377
PHOTOGRAPHIC APPARATUS
Wilfred A. Kettler, 5752 Degiverville, St. Louis, Mo.
Filed June 13, 1956, Ser. No. 591,039
21 Claims. (Cl. 95—93)

This invention relates to improvements in photographic apparatus. More particularly, this invention relates to improvements in automatic film developing apparatus.

It is therefore an object of the present invention to provide an improved automatic film developing apparatus.

In the developing and processing of photographic film, it is usually necessary to immerse the film in a number of different solutions, and to wash the film intermediate some of those immersions. Large and expensive film developing machines are available which move the film consecutively through the various film-treating and wash solutions. While those machines are usable, they are so expensive that they can be purchased only by persons or organizations doing a large volume of film developing work. As a result, others who wish to do their own film developing work are faced with the task of immersing the film in the various film-treating and wash solutions by hand. Such a procedure can be arduous and time-consuming, and the work and time required keeps many persons from developing their own films. The present invention makes it possible for many additional people to do their own developing of photographic film, and it does so by providing an inexpensive, compact and automatic film developing apparatus. It is therefore an object of the present invention to provide an inexpensive, compact and automatic film developing apparatus.

The film developing apparatus provided by the present invention is equipped with a substantially light-tight housing which has a stationary upper portion and a rotatable lower portion. The rotatable lower portion of the light-tight housing carries a number of receptacles for film-treating solutions. A vertically movable support extends part way into the light-tight housing, and that support carries a film rack. The vertically movable support can hold the film rack in register with one of the receptacles for the film-treating solutions, and it can carry that rack down into that receptacle to immerse the film on that rack in the film-treating solution. By raising the vertically movable support, and then successively rotating the lower portion of the light-tight housing and lowering the vertically movable support, the present invention makes it possible to immerse the film rack in the various film developing solutions of the various receptacles. It is therefore an object of the present invention to provide a film developing apparatus which has a vertically movable support for a film rack and which has a rotatable section of a light-tight housing to move the receptacles for the film developing solutions relative to that vertically movable support.

The vertically movable support of the film developing apparatus provided by the present invention has a vertical axis, and it is rotatable about that axis. This rotation enables that vertically movable support to immerse the film in different film-treating solutions even though the rotatable portion of the light-tight housing remains stationary. The combination of the rotatable, vertically movable support and the rotatable lower portion of the light-tight housing enables the film developing apparatus to provide a large number of individually different sequences of film-treating immersions. For example, that film developing apparatus can rotate the lower portion of the light-tight housing step by step until all of the solutions in the various receptacles have been brought into register with the film rack carried by the vertically movable support. That film developing apparatus can also rotate the vertically movable support to place the film rack in register with the solutions in two of the receptacles even without any rotation of the lower portion of the light-tight housing. Furthermore, the film developing apparatus provided by the present invention can interchangeably rotate the vertically movable support and the lower portion of the light-tight housing to provide any desired sequence of film treatment. It is therefore an object of the present invention to provide a film developing apparatus which has a rotatable support for receptacles containing film-treating solutions and which has a rotatable, vertically movable support for a film rack.

The light-tight housing of the film developing apparatus has an opening that is normally closed, and a lamp is placed adjacent to and in register with that opening. The opening is normally closed by a door, and when that door is opened and the pump is energized, the film is given a "reversal exposure." The film developing apparatus provided by the present invention automatically opens the door and energizes the lamp when the vertically movable support moves the film rack into register with the opening in the light-tight housing, thereby providing the desired "reversal exposure."

A blower housing is connected to the light-tight housing of the film developing apparatus of the present invention. That blower housing contains a blower that can draw air through the light-tight housing to dry the film. A cover normally keeps the blower housing light-tight and keeps that housing substantially air-tight, but that cover opens automatically when the blower is energized.

The receptacles for the film-treating solutions are located adjacent the periphery of the rotatable lower portion of the light-tight housing, and those receptacles define a central area for wash water. The vertically movable support can selectively place the film rack carried thereby in register with that central area or with one or another of the receptacles adjacent that central area. Consequently, relatively short rotations of the vertically movable support can shift the film rack between the wash water and two film-treating solutions and vice versa.

The film developing apparatus provided by the present invention has a drain, and it has a valved conduit that supplies fresh wash water. The vertically movable support is set to open the valve in that conduit whenever that vertically movable support immerses the film rack in the wash water. In this way, the film developing apparatus provided by the present invention assures full washing of the film and thereby assures minimum contamination of the film-treating solutions in the various receptacles. It is therefore an object of the present invention to provide a valved conduit that supplies fresh wash water, and that opens th evalve in that conduit whenever the film rack is in the wash water.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

In the drawing,

FIG. 1 shows a front elevational view of one form of film treating apparatus that is made in accordance with the principles and teachings of the present invention, FIG. 2 is a plan view of the film treating apparatus of FIG. 1, FIG. 3 is a plan view, on a larger scale, of the film treating apparatus of FIGS. 1 and 2, and it shows that apparatus with the cover thereof removed, FIG. 4 is a partially broken away, partially sectioned, elevational view of a portion of the structure shown in FIG. 3, FIG. 5 is a sectional view of a portion of the structure shown in FIG. 3, and it is taken along the plane indicated by the line 5—5 in FIG. 3, FIG. 6 is a sectional view of another portion of the device shown in FIG. 3, and it is taken along the broken plane indicated by the line 6—6 in FIG. 3, FIG. 7 is a sectional view of yet another portion of the structure shown in FIG. 3, and it is taken along the plane indicated by the line 7—7 in FIG. 3, FIG. 8 is a sectional view of still another portion of the structure shown in FIG. 3, and it is taken along the plane indicated by the line 8—8 in FIG. 3, FIG. 9 is a sectional view in plan of the structure shown in FIG. 8 after the ring thereof has been rotated one hundred and eighty degrees, and that view is taken along the plane indicated by the line 9—9 in FIG. 8, FIG. 10 is a sectional view in plan of a portion of the structure shown in FIG. 1, and it is taken along the broken plane indicated by the line 10—10 in FIG. 19, FIG. 11 is a front elevational view of the film cartridge used with the film developing apparatus of FIG. 1, FIG. 12 is a plan view of the film cartridge of FIG. 11, FIG. 13 is a sectional view in plan of the film cartridge of FIG. 11, and it is taken along the plane indicated by the line 13—13 in FIG. 11, FIG. 14 is a sectional view in elevation, on a larger scale, of the film rack of the film cartridge of FIG. 11, and it is taken along the plane indicated by the line 14—14 in FIG. 12, FIG. 15 is a cross sectional view of a light-sealing element usable with the film cartridge of FIG. 11, FIG. 16 is a partially broken away, sectional view of a manipulator for the light-sealing element of FIG. 13, FIG. 17 is a sectional view in plan of the film cartridge of FIG. 11, and it is taken along the plane indicated by the line 17—17 in FIG. 11, FIG. 18 is a sectional view in elevation of a portion of the film cartridge, light-sealing element and manipulator of FIG. 11, and it is taken along the plane indicated by the line 18—18 in FIG. 17, FIG. 19 is a side elevational view of a portion of the film treating apparatus shown in FIG. 1, FIG. 20 is a sectional view in elevation of a portion of the structure shown in FIG. 19, and it is taken along the plane indicated by the line 20—20 in FIG. 19, FIG. 21 is a sectional view in elevation of the portion of structure shown in FIG. 20, and it shows that structure after the vertically movable support for the film rack has been moving downwardly.

FIG. 22 is a sectional view in plan of a portion of the film treating apparatus of FIG. 1, and it is taken along the plane indicated by the line 22—22 in FIG. 1, FIG. 23 is a sectional view in plan, on an enlarged scale, of a portion of the structure shown in FIG. 22, FIG. 24 is a side elevational view of a portion of the the film treating apparatus shown in FIG. 1, and this portion is disposed above the level of the portion shown in FIG. 19, FIG. 25 is a sectional view in elevation of one part of the structure shown in FIG. 24, and it is taken along the broken plane indicated by the line 25—25 in FIG. 24, FIG. 26 is a sectional view in elevation of part of the structure shown in FIG. 27, and it is taken along the broken plane indicated by the line 26—26 of FIG. 27, FIG. 27 is a sectional view in plan of part of the structure shown in FIG. 25, and it is taken along the plane indicated by the line 27—27 in FIG. 25, FIG. 28 is a sectional view in plan of another part of the structure shown in FIG. 25, and it is taken along the plane indicated by the line 28—28 in FIG. 25, FIG. 29 is a sectional view, in elevation, of another portion of the structure shown in FIG. 24, and it is taken along the plane indicated by the line 29—29 in FIG. 24, FIG. 30 is a partially sectioned front elevational view of another portion of the structure of FIG. 1, FIG. 31 is a sectional view in plan of the structure shown in FIG. 29, and it is taken along the plane indicated by the line 31—31 in FIG. 29, FIG. 32 is a sectional view in plan comparable to the view of FIG. 31, but it shows the pin in the upwardly acting thread of the shaft, FIG. 33 is a partially sectional plan view of a portion of the film treating apparatus of FIG. 1, and it shows the water valve of that apparatus, FIG. 34 is a sectional view in plan of the structure shown in FIG. 20, and it is taken along the plane indicated by the line 34—34 in FIG. 20, FIG. 35 is a sectional view in plan of the structure shown in FIG. 21, and it is taken along the plane indicated by the line 35—35 in FIG. 21, FIG. 36 is a sectional view in plan of the structure shown in FIG. 20, and it is taken along the plane indicated by the line 36—36 in FIG. 20, FIG. 37 is a partially sectioned, front elevational view of a portion of the structure shown in FIG. 1, FIG. 38 is a partially sectioned, front elevational view generally comparable to that shown in FIG. 37, but it shows the stop out of the path of the rib on the vertically movable support for the film rack, FIG. 39 is a partially sectional plan view of the structure shown in FIGS. 37 and 38, FIG. 40 is a front elevational view on a larger scale of a part of the cam-supporting disc of FIG. 1, FIG. 41 is a sectional view of the part of the cam-supporting disc shown in FIG. 40, and it is taken along the plane indicated by the line 41—41 in FIG. 40, FIGS. 42 through 48 show cams that can be mounted on the cam-supporting disc of FIG. 1, FIG. 48 is a sectional view of another part of the cam-supporting disc of FIG. 1, and it shows a stop on that cam-supporting disc, FIG. 49 is a side elevational view of a film rack for moving picture film, FIG. 50 is a sectional view in plan of the film rack in FIG. 49, and it is taken along the plane indicated by the line 50—50 in FIG. 49, FIG. 51 is a sectional view in elevation of the center of the shaft for the film developing apparatus of FIG. 1, FIG. 52 is a diagram of the electrical circuit for the film treating apparatus shown in FIG. 1, FIG. 53 is a plan view of the dial and pointer of the variable speed motor for the film treating apparatus shown in FIG. 1, FIG. 54 is an elevational view of the latch shown in FIG. 8, FIG. 55 is a sectional view through the sleeve shown in FIG. 8, and it is taken along the plane indicated by the line 55—55 in FIG. 9, FIG. 56 is a view of a yoke and bar used in the film treating apparatus of FIG. 1, FIG. 57 is a view of a portion of the yoke of FIG. 56, FIG. 58 is a sectional view of the water valve used in the film treating apparatus of FIG. 1, and FIG. 59 is a sectional view in plan of the upper end of the upwardly directed thread of the shaft in FIG. 1.

Referring to the drawing in detail, the numeral 100 denotes a bar of sturdy proportions which is part of an X-frame base for the film developing apparatus provided by the present invention. The bar 100 has vertically directed feet 102 which are releasably connected to it by fasteners 101, shown in the form of screws. Those fasteners pass through openings at the opposite ends of the bar 100 and seat in threaded openings in the upper ends of the feet 102. The other bar of the X-frame is denoted by the numeral 104, and that bar has feet 106. Fasteners 105, shown in the form of screws, releasably connect the feet 106 to the bar 104. Removal of the fasteners 101 and 105 makes it possible to separate the feet 102 and 106 from the bars 100 and 104. This is desirable because it makes it possible to stow the base of the film developing apparatus in a small space.

A socket 108 is secured to, and projects upwardly from, the bar 100 adjacent the center of that bar. That socket has a threaded rod, not shown, on the lower end thereof that extends downwardly through an opening in the center of the bar 104. A nut, not shown, telescopes over the lower end of that threaded rod, and that nut can be tightened to clamp the two bars 100 and 104 tightly together and to the socket 108. The bars 100 and 104 will usually be set at ninety degrees to each other to provide full support for the film developing apparatus provided by the present invention. A stem 110, shown in the form of a metal pipe or tube, releasably extends into and is held by the socket 108. A sleeve 112 telescopes over the upper end of the stem 110, and that sleeve is releasably secured to that stem by a fastener 114, shown in the form of a set screw. The sleeve 112 is pressed on, or otherwise fixedly secured to, the lower end of a hollow rod 116 shown in the form of a pipe or tube. This rod will be concentric with the stem 110 and will essentially constitute an elongation of that stem.

When the bars 100 and 104 are tightly clamped together and to socket 108, when the stem 110 is seated in the socket 108, and when the sleeve 112 is telescoped over and locked to the stem 110, a sturdy and rigid support for the film developing apparatus is provided. However, the bars 100 and 104 can be separated from the stem 110, the sleeve 112 and the rod 116 can be separated from the stem 110, and the feet 102 and 106 can readily be separated from the bars 100 and 104. In this way, the film developing apparatus can be stowed in a small space; and one embodiment of the present invention has been stowed and carried in a case about the size of a piece of hand luggage.

A platform 118 is suitably secured to the upper end of the rod 116, as by having a threaded recess in the underside thereof into which the threaded upper end of the rod 116 can extend and be held. An opening 119, that is smaller than the internal diameter of the rod 116, extends downwardly from the upper side of platform 118 and communicates with the said threaded recess. The opening 119 communicates with the center of the hollow rod 116.

The platform 118 has a second and larger opening 121 therein, and that opening is spaced to the right of the opening 119, as the platform 118 is viewed in FIG. 22. A sleeve 120 with a radially-extending flange intermediate the top and bottom thereof is telescoped through the opening 121 in the platform 118. The flange on the sleeve 120 abuts the under side of the platform 118 and is held in engagement with that platform by fasteners, shown in the form of screws. A cup-like closure 122 is provided for the lower end of the sleeve 120; and a fastener 124, shown in the form of a screw, is used to secure the closure 122 to the sleeve 120. The engagement between the sleeve 120 and the closure 122 will be so intimate that a liquid-tight engagement will be provided. A threaded boss 126 is provided on the lower end of the closure 122, and that boss has a central opening 128 therethrough. A discharge tube 130 is located above the level of the boss 126, and that discharge tube projects radially outwardly from the closure 122. The discharge tube 130 is in communication with the lower end of the sleeve 120, as indicated particularly in FIG. 7.

A bearing ring 134 abuts the upper end of the sleeve 120, and the inside diameter of that ring is equal to the inside diameter of the sleeve 120. A set screw 136 is seated in a threaded opening in the ring 134, and that set screw locks the bearing ring 134 to a sleeve 132. The lower end of that sleeve extends into, and can rotate relative to, the sleeve 120. The upper end of sleeve 132 extends upwardly from the bearing ring 134.

A bevel gear 138 telescopes down over the upper end of the sleeve 132 and rests upon the upper end of the bearing ring 134. The engagement between the inner periphery of the bevel gear 138 and the outer periphery of the sleeve 132 is loose enough so the bevel gear 138 can rotate freely relative to the sleeve 132 and to the bearing ring 134.

A flanged sleeve 142 telescopes down over the upper end of the sleeve 132; and a pin 133 carried by sleeve 132 extends into a slot 143 in flanged sleeve 142, as shown particularly in FIGS. 7 and 22. The pin and slot hold sleeves 132 and 142 for conjoint rotation while permitting the sleeve 142 to move downwardly relative to the sleeve 132. A cork disc 140 of annular configuration is cemented or otherwise fixedly secured to the lower face of the flange on the sleeve 142. That cork disc serves as a clutch facing for the flanged sleeve 142, and it engages the upper face of the bevel gear 138. A spring 144, in the form of a helical compression spring, bears against the upper end of the flanged sleeve 142 and biases that sleeve downwardly into engagement with the bevel gear 138.

The numeral 146 denotes a plate with a downwardly depending sleeve portion; and that downwardly depending sleeve portion telescopes over the upper end of the sleeve 132. Internal screw threads are provided at the upper end of the sleeve portion of plate 146, and those screw threads receive external screw threads on the upper end of the sleeve 132. The plate 146 underlies and supports a cylindrical tank 148 that is made to hold liquid. The sleeve 132, the plate 146 and the tank 148 are connected together to rotate as a unit. The weight of the sleeve 132, of the plate 146, and of the tank 148 and its contents help the spring 144 urge the cork disc 140 against the bevel gear 138.

An annular overflow passage 150 is provided on the exterior of the cylindrical tank 148. That overflow passage extends around the entire periphery of the tank 148, and it is placed in communication with that tank by openings 152. An overflow tube 154 has an opening 156 which is in register with one of the openings 152 in the overflow passage 150; and that overflow tube extends upwardly from an opening 158 in the bottom of the cylindrical tank 148. The overflow tube 154 also extends downwardly from the opening 158 and then extends radially inwardly to an opening 160 in the sleeve portion of the plate 146. Water tight joints are provided between the tube 154, the tank 148 and the plate 146 adjacent the openings 158 and 160. The tube 154 also extends into an opening 162 in the sleeve 132. Consequently, the overflow tube 154 places the annular overflow passage 150 in communication with the sleeve 132.

A flat ring 164 is disposed on the bottom of the tank 148, and that ring projects up a short distance above the level of that bottom. A larger diameter ring 166 is secured to the wall of the tank 148 at a point a short distance below the open upper end of that tank. The ring 166 has a number of arcuate notches formed in it, and those notches are circumferentially spaced in the tank 148. A number of bosses 170 are formed on the bottom of the plate 146, and those bosses are generally in register with the notches 168 in the ring 166. Each of the bosses 170 has a threaded recess 172, and those recesses receive threaded studs 176 on the bottoms of generally cylindrical receptacles 174. The threaded studs 176 make it possible to hold the receptacles 174 rigid relative to the tank 148; because as the receptacles are rotated into assembled relation with the tank, the inner portions of those receptacles engage the ring 164 and cause the receptacles to tilt outwardly until the outer portions thereof engage and seat solidly in the notches 168 of ring 166. In this way, the receptacles are positively positioned in the tank 148.

The numeral 178 denotes a sleeve of metal which has the lower end thereof extending downwardly through an opening 180 in the bottom of the film treating tank 148;

and the joint between sleeve 178 and tank 148 will be liquid-tight. The upper end of that sleeve is fixedly secured to, but extends above, a notch in the ring 166. An internal shoulder 182 is formed, at the bottom of the sleeve 178, by an inwardly directed flange 184 in that sleeve. The upper end of the sleeve 178 extends above the level of the overflow openings 152 in the tank 148, and thus that sleeve will not permit liquids to leak out of that tank. A portion of the bottom edge of the sleeve 178 is cut away to define a semi-cylindrical skirt 179.

A pivot bracket 186 which is provided with two vertically spaced, horizontal ears is mounted on that portion of sleeve 178 which extends below the bottom of the tank 148, and it is adjacent one end of the semi-cylindrical skirt 178. A pin 188 extends through those ears and serves as a pivot for a ring 190. That ring has an inwardly directed flange 192 which defines an internal shoulder adjacent the bottom of that ring. That ring also has a semi-cylindrical wall 194 that projects upwardly from its upper edge. That semi-cylindrical wall has one end thereof adjacent the pivot bracket 186.

The ring 190 is secured to the pin 188 by ears 196 which are provided with openings that receive the pin 188. A helical spring 198 is telescoped over the pin 188 after that pin has been passed downwardly through the opening in the upper ear of pivot bracket 186 and through the opening in the upper ear 196, but before that pin has been inserted in the opening in the lower ear of the pivot bracket 186. The spring 198 bears against the pivot bracket 186 and also bears against the ring 190, thereby biasing the ring 190 out of register with the sleeve 178. However, that spring can yield to permit rotation of the ring 190 away from the sleeve 178. Whenever the ring 190 is in register with the sleeve 178, the skirt 179 on that sleeve will be contiguous with the semi-cylindrical wall 194 on that ring. That skirt and wall will overlie the horizontal joint between the sleeve 179 and the ring 190 and will prevent the passage of light therethrough.

A generally L-shaped pivot bracket 200 is mounted on that portion of the sleeve 178 which is below the bottom of the tank 148, and that bracket is approximately opposite the pivot bracket 186. The pivot bracket 200 supports a pivot 202; and a generally U-shaped latch 204 rotates about that pivot. That latch selectively holds or releases a radially extending ear 206 on the ring 190, and thus controls whether the ring 190 is held in register with or is permitted to rotate away from the sleeve 178. A helical spring 203 encircles the pivot 202 and bears against the latch 204 and also against the bracket 200, thereby biasing the latch 204 into position to hold the ear 206.

An elongated pin 208 is held for vertical reciprocation within a tube 214 carried by the tank 148; and the bottom of that pin rests upon a horizontal flange of latch 204, as indicated particularly in FIG. 8. A stop 210 is mounted on the pin 208 adjacent the lower end of that pin, and that stop is normally biased up into engagement with the lower end of the tube 214 by the spring 203 which biases the latch 204 for upward rotation. However, the spring 203 can yield to permit downward movement of the rod 208 and of the stop 210 thereon.

A yieldable band 218, of compressible material such as cloth or the like, is suitably affixed to the exterior of the tank 148 above the level of the overflow passage 150. That band has part thereof folded under, as indicated particularly in FIG. 7, and thus the lower portion of the folded band projects outwardly a short distance beyond the upper portion of that band. The band can readily be connected to the tank 148; and it will prevent the ingress of light between the upper end of tank 148 and the bottom of a cover therefor.

An elongated tube 220 is located at the geometric center of the sleeve 132, and that tube extends upwardly through an opening 222 at the center of the bottom of tank 148. The upper end of tube 220 is provided with a circular flange, and that flange is suitably secured to the bottom of tank 148 to provide a liquid-tight engagement between that tube and that tank. The lower end of the tube 220 extends downwardly through the opening 128 in the boss 126 on the closure 122. The engagement between the opening 128 in the boss 126 and the tube 220 will be loose enough to permit the tank 148 and the tube 220 to rotate relative to the closure 122. A packing gland 224 is provided with internal threads that telescope over the externally threaded lower end of the boss 126 on the closure 122; and that gland will receive packing, not shown, which can maintain a liquid-tight joint between tube 220 and boss 126 while permitting rotation of that tube relative to the gland 224. The lower end of the packing gland 224 is formed so a hose or flexible conduit, such as the hose 659, can be telescoped over it. The hose 659 is resilient, and it has an initial inner diameter that is smaller than the outer diameter of the lower end of the packing gland 224. Consequently, that hose can form a liquid-tight joint with that gland when it is slipped over the lower end of that gland.

A number of projections 226 are provided on the bottom of the tank 148, and those projections extend outwardly and downwardly from the bottom edge of that tank. As emphasized in FIG. 25, those projections are L-shaped in cross section and have a vertically depending portion.

The numeral 228 denotes a generally rectangular bracket which is secured to the platform 118 by fasteners, shown as being screws. That bracket is taller than it is wide, and it defines a large, open central area. An opening 229 is provided in one of the sides thereof, as shown particularly in FIG. 26. The top of the bracket 228 has a circular opening therein, and the bottom of that bracket has a circular opening therein, and those openings are in register with each other to receive a cylindrical pin 230. That pin has a collar 232 mounted on it, and that collar is locked to the pin 230 by a fastener 234, shown in the form of a pin. A second collar 236 is mounted on the rod 230 by a fastener 238, shown in the form of a pin; and the collar 236 is located above the collar 232. The collar 236 can abut the underside of the top of bracket 228 and thereby limit upward movement of the rod 230 relative to that bracket. The collar 232 receives the upper end of a helical compression spring 242 which has its lower end abutting the bottom of the bracket 228; and that spring biases the rod 230 upwardly relative to the bracket 228. As a result, the collar 236 is normally held in abutting relation with the top of bracket 228; but the spring 242 can yield to permit downward movement of the rod 230 relative to bracket 228. A slot 240 is formed in the rod 230, and that slot extends axially of that rod. The slot 240 is intermediate the collars 232 and 236, and it is in register with the slot 229.

A bracket 244 is secured to that side of bracket 228 which has the slot 229; and the bracket 244 has a vertically directed slot 246 shown particularly in FIG. 26. The slots 229 and 246 are contiguous, but the upper end of slot 246 extends upwardly above the upper end of slot 229. A second slot 248, that is narrow and horizontal, is formed in the upper end of the bracket 244, as shown in FIG. 26. The slots 246 and 248 are in communication with each other.

The numeral 250 denotes a bearing bracket which is secured to the upper side of platform 118 a short distance to the left of the right hand end of that bracket, as that bracket is viewed in FIG. 22. The numeral 252 denotes a second bearing bracket which is secured to the upper side of platform 118, and that second bracket is disposed to the left of the bracket 250. The brackets 250 and 252 rotatably support a shaft 254 which has its axis parallel to the axis of the platform 118.

A sprocket pinion 256 is fixedly secured to the shaft 254 by a fastener, shown in the form of a pin; and that sprocket pinion is immediately adjacent the bearing bracket 250. A combination worm gear and cam is secured to the shaft 254 by a fastener, shown in the form of a pin, and that combination worm gear and cam is positioned adjacent the bearing bracket 252. The worm section of that combination worm gear and cam is denoted by the numeral 258, and the cam section thereof is denoted by the numeral 260. A worm wheel 262 is secured to the shaft 254 at a point to the left of bearing bracket 252, and an end-face cam 264 is secured to the left hand end of shaft 254, as that bracket and shaft are viewed in FIG. 22. The configuration of the cam section 260 of the combination worm gear and cam is emphasized in FIG. 26, and the configuration of the cam 264 is emphasized in FIG. 24.

A bearing bracket 266 of U-shaped configuration is secured to upper side of platform 118 adjacent the right hand end of that platform. The bearing bracket 266 is adjacent the bearing bracket 250, and it rotatably supports a shaft 268 which is parallel to the shaft 254. The shaft 268 has a sprocket pinion 270 mounted on it, and sprocket pinions 270 and 256 are in register with each other and are connected together by a sprocket chain 274. A bevel gear 272 is secured to the left hand end of the shaft 268, as that shaft is viewed in FIG. 22; and a fastener, shown in the form of a pin, secures that gear to the shaft 268. A fastener, shown in the form of a pin, secures the sprocket pinion 270 to the shaft 268. The bevel gear 272 meshes with the bevel gear 138 that is rotatably supported by sleeve 132, and hence rotation of the shaft 254 will cause rotation of the bevel gear 138.

An L-shaped bracket 276 is secured to the upper side of platform 118 by fasteners, shown in the form of screws; and one end of that bracket overhangs one side of that platform. The bracket 276 is disposed to the left of bevel gear 138 as that gear is viewed in FIG. 22; and that bracket supports a switch 278 that is provided with an actuator 280. The switch 278 is a single pole, single throw switch, and it is connected as shown in the circuit diagram of FIG. 52.

A shaft 282 has one end thereof supported by the bearing bracket 252, and that shaft is parallel to the shaft 254. The shaft 282 has a collar 284 on it, and that collar is immediately adjacent bearing bracket 252. A fastener, not shown, locks the collar 284 against rotation relative to the shaft 282. The other end of the shaft 282 is supported by an L-shaped bearing bracket 286, shown in FIG. 24. The horizontal portion of bearing bracket 286 is secured to the platform 118; and it extends from the left hand end of platform 118 to a point to the right of bearing bracket 252, all as shown in FIG. 24. A cam follower 288 having the form of a thick circular disc with a projecting arm is secured to the left hand end of the shaft 282, as that shaft is viewed in FIG. 24.

A generally vertical lever 290, with a hub at the bottom thereof, is telescoped over the right hand end of the shaft 282. The hub of lever 290 is secured to the shaft 282 by a fastener, shown in FIG. 24 in the form of a pin. A helical spring 292 encircles that portion of the right hand end of shaft 282 that is between lever 290 and bearing bracket 252, and that spring has one end thereof bearing against that lever and has the other end thereof bearing against that bearing bracket.

That spring biases the lever 290 for rotation in the counter clockwise direction as that lever is viewed in FIG. 25; but that spring can yield to permit rotation of the lever 290 in the clockwise direction.

The numeral 294 denotes a generally horizontal lever which has one end thereof connected to the upper end of the vertical lever 290 by a fastener 298, shown in the form of a screw. The other end of the lever 294 carries a pin 296 which lodges in the horizontal slot 248 of the U-shaped bracket 244 on bracket 228. The spring 292 acts through lever 290 and lever 294 to normally hold the pin 296 at the inner end of the slot 248. However, that spring can yield to permit the levers 290 and 294 to pull the pin 296 toward the outer end of that slot.

The numeral 300 denotes a cam follower in the form of a generally horizontal lever; and, as indicated in FIG. 26, that lever extends through the slot 240 in the pin 230. The lever 300 has a projection 302 on the upper edge thereof, and that projection underlies the outer end of the slot 248 in the bracket 244. A pin 304 is carried by the left hand end of the lever 300, as that lever is viewed in FIG. 26, and that pin prevents accidental separation of the cam follower 300 from the rod 230. A helical extension spring 306 extends through an opening in the right hand end of the cam follower 300 and biases that end downwardly.

The cam follower 300 rests upon the cam section 260 of the combined worm gear and cam, all as shown in FIG. 26; and that cam follower will respond to rotation of cam section 260 to tend to move up and down. Because the spring 306 tends to hold the right hand end of lever 300 against upward movement, the "rise" of cam section 260 will normally raise the left hand end of that lever from the position shown in FIG. 26 to a position disposed thereabove. The pin 296 is normally out of the path of projection 302 on lever 300, and slot 240 in the rod 230 is elongated; and hence such movement of the left hand end of lever 300 is normally possible. However, when the levers 290 and 294 pull the pin 296 to the position shown by dotted lines in FIG. 26, that pin blocks the path of projection 302, and the "rise" of the cam section 260 can not move the left hand end of lever 300 upwardly; instead, the pin 296 will force the lever 300 to rotate about it in the counter clockwise direction, thereby forcing the left hand end of lever 300 downwardly. This forces the rod 230 downwardly and moves the upper end of that rod out of the path of the projections 226 on the tank 148. The spring 306 yields to permit this rotation of lever 300, and spring 242 yields to permit this movement of rod 230. Once the "rise" and "dwell" of the cam section 260 have rotated out of engagement with the lever 300, the springs 242 and 306 will return rod 230 and lever 300 to the positions shown in FIG. 26.

The lower end of the spring 306 is hooked through an opening, not shown, in a lug 308 attached to the under side of the platform 118. That lug projects to the right of platform 118, as that platform is viewed in FIG. 25; and it holds the lower end of spring 306 against vertical movement, thereby enabling that spring to provide a downward bias on the right hand end of the follower 300.

The numeral 310 denotes a bearing bracket which is secured to the upper side of platform 118 at a point to the right of bracket 228, as those brackets are viewed in FIG. 22. The outer end of bearing bracket 310 is inclined to the plane of the platform 118, and it has a bearing sleeve depending therefrom, as emphasized particularly in FIG. 25. A shaft 312 has its upper end journalled in the bearing bracket 310, and that upper end carries a worm wheel 314. That worm wheel is adjacent to and meshes with the worm gear section 258 of the combination worm gear and cam that is mounted on shaft 254. A bearing bracket 316 and a bearing bracket 328 are suitably secured to each other and to the rod 116. The bearing bracket 316 has an opening therein which receives the lower end of the shaft 312; and that lower end carries a worm gear 318.

A bearing bracket 320 is secured to the under side of platform 118 adjacent the left hand end of that platform, as that platform is viewed in FIG. 24; and that bracket depends downwardly from that platform. A shaft 322 has one end thereof extending through an opening in the lower end of bearing bracket 320, and that shaft has a collar 324 on it immediately adjacent one face of that bearing bracket. A second collar 326 is mounted on the shaft 322 immediately adjacent the other face of the bearing bracket 320, and the collars 324 and 326 prevent axial movement of shaft 322. The other end of that shaft extends into an opening in the bearing bracket 328.

A worm wheel 332 is secured to the shaft 322 adjacent the bearing bracket 316, and that worm wheel meshes with the worm gear 318. Consequently, rotation of shaft 254 will cause rotation of shaft 322. However, the worm gears 258 and 318 and the worm wheels 314 and 332 reduce the rate of rotation of shaft 322 to but a fraction of the rate of rotation of shaft 254. A circular plate 334 is secured to the shaft 322 adjacent the collar 326, and it is secured to that shaft by a fastener, shown in the form of a pin. The plate 334 has a small diameter externally threaded annular portion extending outwardly beyond the left hand end of shaft 322, and it has a larger diameter cylindrical shoulder 335. The externally threaded small diameter annular portion of plate 334 receives and holds the internally threaded hub of a plate 336; and a cylindrical recess 337 in plate 336 telescopes over the shoulder 335 on plate 334. The plates 334 and 336 serve as clamps for a cam-supporting disc 338 of circular configuration. That cam-supporting disc has a central opening which enables it to telescope over the threaded small diameter annular portion of plate 334 and to seat on the shoulder 335 of that plate. The cam-supporting disc 338 has a large number of radially-directed slots 339 extending inwardly from the outer periphery of that disc. The slots 339 facilitates the releasable securement of a number of slotted cams to the disc 338; and those cams are shown in FIGS. 42–47. The manner in which the cams are mounted on the disc 338 is emphasized in FIGS. 40 and 41. The releasable securement of the cams to the cam-supporting disc 338 makes it possible for just one cam-supporting disc and a few cams to provide a great variety of individually different camming cycles.

The numeral 346 denotes a plate which is suitably secured to the rod 116 by the U-shaped spacers shown in FIG. 10, and those spacers are preferably welded to the rod 116 and to the plate 346. Two such spacers are provided; one being adjacent the upper edge of plate 346 and the other being adjacent the lower edge of that plate. The plate 346 extends tangentially from the rod 116, and it has its long axis horizontal while having its short axis vertical. That plate supports a bearing bracket 348 which is L-shaped in cross section. A bearing sleeve 349 is provided on the horizontally directed portion of that bracket, and that bearing sleeve confines the lower end of a vertically directed shaft 350. The upper end of that shaft is confined by a bearing sleeve 352 which extends upwardly from the upper side of the platform 118. An axially directed groove 351 is provided in the shaft 350, as emphasized in FIGS. 25 and 28, and that groove is disposed a short distance below the platform 118.

A worm gear 354 is mounted on the upper end of the shaft 350, and that gear engages and drives the worm wheel 262 mounted on the horizontal shaft 254. Consequently, rotation of shaft 350 causes rotation of shafts 254, 312 and 322. A sprocket pinion 356 is mounted on the lower end of that shaft 350, as emphasized in FIG. 19; and that pinion is suitably secured to the shaft 350 by a fastener, shown in the form of a pin. A large diameter sprocket gear 358 is secured to the lower end of the shaft 350 at a point immediately below the sprocket pinion 356; and the sprocket gear 358 is secured to the shaft 350 by a fastener, shown in the form of a pin.

An L-shaped mounting bracket 360 is secured to the plate 346; and the mounting brackets 348 and 360 are oppositely disposed of that plate as shown in FIG. 10. A variable speed motor 362 is supported on the bracket 360, and the shaft of that motor carries a sprocket pinion 364. That sprocket pinion is in register with the sprocket gear 358, and a sprocket chain 366 interconnects that pinion and gear for conjoint rotation.

A vertically directed sleeve 368 is suitably secured to the outer end of the plate 346 by spacers 367. Those spacers are preferably welded to the plate 346 and to the sleeve 368; and two such spacers are used, one being adjacent the upper end of the plate 346 and the other being adjacent the lower end of that plate. A bushing 370, shown in FIGS. 20 and 21, is telescoped within the sleeve 368; and it is held in assembled relation with that sleeve by a press fit. The upper end of the bushing projects a short distance above the upper end of sleeve 368 to support the inner race of an anti-friction bearing 398.

A ring 372 telescopes over the upper end of sleeve 368, and it is secured to that upper end by a fastener 376, shown as a set screw. The ring 372 has an L-shaped flange 374 thereon, and that flange is generally semi-circular in plan view, as shown by FIG. 34.

An elongated cylindrical shaft 378 has the lower end thereof guided by, and extending downwardly through, the bushing 370; and that shaft is rotatable relative to that bushing. The shaft 378 has a helical thread 379 which is formed to provide a downward thrust; and it has a helical thread 377 which is formed to provide an upward thrust. The thread 379 is best shown in FIGS. 20 and 21, and the thread 377 is best shown in FIG. 4.

The lower end of the shaft 378 has a small diameter sprocket gear 380 secured to it by a fastener, shown in the form of a pin. That gear is in register with the sprocket pinion 356, as shown by FIG. 19, and a sprocket chain 382 extends between and connects pinion 356 with gear 380. A lever 384 is rotatably secured to the L-shaped bracket 348 by a fastener 386, shown in the form of a screw. That lever carries a pin 388 which bears against the sprocket chain 382 and serves to keep that chain taut.

The numeral 390 denotes a generally triangular, horizontally directed plate which has an arcuate base and which has an arcuate apex, as shown in FIG. 3. The two sides and the apex of the plate 390 have the edges thereof bent upwardly to form a continuous upwardly-directed flange. The arcuate base line has a radius of curvature complementary to the radius of curvature of the tank 148, and that arcuate base is held closely adjacent the outer periphery of the tank 148 at a point above the annular overflow passage 150. An arcuate, upwardly directed flange 391 is provided on the plate 390 adjacent the arcuate base of that plate, and that flange extends toward but stops short of the upturned edges on the sides of the triangular plate 390, as shown in FIG. 3. The flange 391 is immediately adjacent the yielding band 218 on the tank 148, and it coacts with that band to prevent the passage of light therebetween. The generally triangular plate 390 has an opening 393 through it, and that opening accommodates a spacing rod 392 which extends between the plate 390 and the platform 118. A second spacing rod 394 is seated in an opening 395 in the triangular plate 390 and extends to the platform 118. Those spacing rods hold the triangular plate rigidly spaced in position above the platform 118.

A generally vertically directed actuator 396 is secured to, and depends downwardly from, the bottom of the generally triangular plate 390, as shown in FIG. 1. The lower end of that actuator is pointed, and that actuator is spaced a short distance to the right of the axis of sleeve 368, as that actuator and sleeve are viewed in FIG. 1.

The anti-friction bearing 398 has the outer race thereof underlying and supporting a collar 400 which is fixedly secured to the shaft 378 by a fastener 402, shown as a set screw. An elongated tube or sleeve 404 telescopes down over the upper end of the shaft 378, and the lower end of that sleeve normally rests on the collar 400 as shown in FIG. 20. A short bushing 401 is fixedly pressed into the sleeve 404 adjacent the lower end of that sleeve, and that bushing has an inner diameter just slightly larger than the diameter of shaft 378. An inner sleeve 405 is telescoped within the sleeve 404; and the outer diameter of sleeve 405 is small enough relative to the inner diameter of sleeve 404 to permit relative rotation of the sleeves 404 and 405. The shaft 378 extends through, and rotates relative to, the sleeve 405. The sleeve 405 is disposed approximately midway of the length of the sleeve 404.

A second, and longer, bushing 409 is fixedly pressed into the sleeve 404, and that second bushing is close to the upper end of sleeve 404. The shaft 378 extends upwardly through and above the bushing, as shown in FIG. 4.

The sleeve 404 has an opening 407 therein of generally rectangular configuration, and that opening is disposed approximately midway of the length of the sleeve 404. The inner sleeve 405 is disposed immediately adjacent the opening 407 in the sleeve 404; and an opening 403 in the inner sleeve 405 is in register with the opening 407 in the sleeve 404.

An elongated, axially directed rib 406 is provided on the outer surface of the sleeve 404, and that rib starts at a point above the level of the opening 407 and extends down to a point a short distance above a collar 408. That collar is telescoped upwardly over the lower end of the sleeve 404, and it is secured to that sleeve by a fastener 410, shown as a set screw. A pin 412 is carried by the collar 408, and that pin projects radially outwardly from that collar.

A bracket 414 is secured to the sleeve 404 at a point below the collar 408; and that bracket has two parallel walls, as shown in FIGS. 35 and 36. The bracket 414 has a hole 415 in it, and that hole is in register with an opening in the lower end of the sleeve 404, as shown in FIGS. 20, 21, 35 and 36. The bracket 414 is secured to the sleeve 404 by fasteners 416, shown as screws. A pivot 418 extends between the upper ends of the parallel walls of the bracket 414, and that pivot rotatably supports an L-shaped lever 420. A leaf spring 422 is connected to the vertical portion of the L-shaped lever 420, and that spring extends upwardly above the horizontal portion of that lever. A pivot 424 rotatably connects the vertical portion of the L-shaped lever 420 with a pin 426 that extends through the opening 415 in the bracket 414 and through the openings in sleeve 404 and bushing 401 that are in register with opening 415. That pin selectively enters the thread 379 of the shaft 378; and whenever that pin has the inner end thereof lodged within that thread while the shaft 378 is rotating, that pin will force the bracket 414 and the sleeve 404 to move downwardly relative to the shaft 378.

A helical spring 428 encircles the pin 426, and one end thereof bears against the lever 420 while the other end bears against the bracket 414. Hence, the spring 228 biases the lever 420 to move the pin 426 out of engagement with the thread 379. A pivot 430 extends between the lower ends of the parallel walls of the bracket 414; and a latch 432 is rotatably supported by that pivot. The latch 432 is biased for counter-clockwise rotation in FIGS. 20 and 21 by a helical spring 434 but that spring will yield to permit rotation of that latch in the clockwise direction. A stop 436 receives one end of the spring 434, and the other end of that spring bears against the latch 432 to bias that latch for rotation to the latching position shown in FIG. 21. However, when the outer end of the latch 432 moves into engagement with the L-shaped flange 374 on ring 372, as it will when the sleeve 404 moves downwardly to the position of FIG. 20, the latch 432 will move out of latching engagement with lever 420.

The numeral 438 denotes a generally rectangular plate which is arcuate in plan, as shown in FIGS. 31 and 32; and that plate is secured to the inner sleeve 405 so it is in register with the opening 407 in the sleeve 404. The arcuate plate 438 is almost as tall as the opening 407, but it is only about one third as wide as that opening. The plate 438 has an opening 440 through it, and that opening is contiguous with and aligned with the opening 403 in the inner sleeve 405. A horizontally flanged bracket 442 is secured to the arcuate plate 438, and that bracket supports a vertically directed pivot 444. A lever 446 is held for rotation about the pivot 444; and that lever has one arm which projects to the right, and it has a second arm which projects toward the vertical wall of the bracket 442. The two arms of the lever 446 are substantially at right angles to each other, and both lie in the same horizontal plane. The free end of the second arm of lever 446 has an upwardly directed ear, and that ear has a rounded button 452 on it. In addition, the second arm of lever 446 has a depending ear 454 thereon at a point spaced a short distance from the upwardly directed ear of that arm. A pin 448 connects the said one arm of lever 446 with the outer end of a rod 450; and the inner end of that rod extends through an opening in the vertical wall of the bracket 442. The downwardly directed ear 454 on the second arm of lever 446 selectively engages an arm of bracket 442 and thereby limits clockwise rotation of that lever, as that lever is viewed in FIGS. 31 and 32.

The bracket 442 also carries a vertical pivot 456, and that pivot rotatably supports a lever 458. That lever has a generally triangular, horizontally directed top, has an arcuate ear depending downwardly from the free end of that top, and has a horizontally directed arm that is displaced a short distance below the level of that top and that extends to the left in FIGS. 31 and 32. The downwardly depending ear of lever 458 carries a rounded button 460 which confronts the rounded button 452 on the lever 446. A helical compression spring 462 has the opposite ends thereof telescoped over the rounded buttons 452 and 460, and that spring biases those buttons away from each other. In doing so, the spring 462 coacts with the levers 446 and 458 to provide a snap action toggle.

The horizontally directed arm of lever 458 carries a pivot 464 that rotatably secures a pin 466 to that arm. The free end of that pin selectively extends through the opening 440 in the plate 438 and through the opening 403 in the inner sleeve 405 to lodge in the helical thread 377 of the shaft 378. A vertically directed stop 468, in the form of a pin, is carried by the bracket 442, as shown by FIGS. 31 and 32; and that stop limits counter-clockwise rotation of the lever 458. In doing so, that stop makes certain that the inner end of the pin 466 can not be pulled out of the openings 403 and 440 in sleeve 405 and plate 438 respectively.

The bracket 442 also has upwardly directed portions that support a horizontal shaft 470, as shown in FIG. 29. That shaft is parallel to, and disposed above the level of, the pin 450. A cam follower 472, which has the form of a thick disc with a tangential arm, is secured to the outer end of the shaft 470 by a fastener 474, shown as a set screw. A collar 476 is mounted on the shaft 472, and that collar is held against rotation relative to that shaft by a fastener 478, shown as a set screw. A helical spring 480 encircles the shaft 470; and one end of that spring bears against the fastener 478 while the other end of that spring bears against the bracket 442. The spring 480 biases the shaft 470 for rotation in the counter-clockwise direction, as that shaft is viewed in FIG. 29; and that spring also biases that shaft for axial movement to the right, as that shaft is viewed in FIG. 24. However, that spring can yield to permit clockwise rotation of that shaft and also to permit shifting of that shaft to the left.

A lever 482 has one end thereof fixedly secured to the right hand end of shaft 470, as shown in FIG. 24; and that lever depends vertically downwardly from that shaft. The lower end of the lever 482 is normally in the position shown in FIG. 31; and in that position, that lower end abuts the stop 485 on bracket 442. Whenever the shaft rotates in the direction of the arrow in FIG. 29, the lower end of the lever 482 will move against the stop 484 on bracket 442, as shown in FIG. 32. When the lever 482 is adjacent the stop 485, and the spring 480 will normally hold that lever against that stop, a space is provided intermediate the lever 482 and the stop 484; but when the cam follower 472 rotates in the clockwise direction, the lever 482 will move against stop 484 and block that normally open space.

A pivot 486 extends vertically between the base, and an upper horizontally directed portion, of the bearing bracket 286. That pivot rotatably supports a cam follower 488 which has an ear 490 that is shown in FIGS. 31 and 32. The ear 490 is mounted so it is in register with, and can normally move into, the normally open space between stop 484 and lever 482. However, that ear will engage and move the lever 482 whenever the cam follower 472 is rotated to move that lever to the position shown in FIG. 32.

The cam follower 488 has an arcuate cam-engaging surface 492, shown in FIG. 24, and that surface is immediately adjacent the end-face cam 264 mounted on shaft 254. The cam 264 has a gradual "rise" and an abrupt "fall," and during each revolution of shaft 254 the "rise" of that cam drives the surface 492, and thus cam follower 488, for counter-clockwise rotation in FIGS. 31 and 32. If the vertical lever 482 has been moved against the stop 484, that rotation of cam follower 488 will cause the ear 490 to engage lever 482 and shift it against the vertical wall of bracket 442; and in shifting against that wall, the lever 482 will force the rod 450 to the position shown in FIG. 32. In moving to that position, the rod 450 rotates lever 446 to the position shown in FIG. 32; and thereupon the spring 462 snaps the lever 458 into the position shown in FIG. 32. This movement of lever 458 inserts the pin 466 in the upwardly directed thread 377 of shaft 378.

A helical spring 494 encircles the lower end of the pivot 486, and that spring biases the arcuate surface of the cam follower 488 toward the end-face cam 264. However, that spring can yield to permit movement of the ear 490 toward the vertical wall of bracket 442; and that movement will occur once during each revolution of shaft 254.

The numeral 498 denotes a bearing bracket which is secured to the underside of platform 118 and depends downwardly from that platform; and that bearing bracket is disposed to the right of the rod 116, as that bracket is viewed in FIG. 24. That bearing bracket supports one end of a horizontal shaft 496, and the other end of that shaft is journalled in the bearing bracket 320, as shown in FIG. 29. A collar 500 is secured to the shaft 496, and that collar is mounted immediately adjacent the bearing bracket 498. The collar 500 limits axial movement of the shaft 496 to the left in FIG. 24. A pin 502 is secured to the shaft 496, at a point to the left of bearing bracket 498, and that pin receives one end of a helical spring 504. The other end of that spring bears against the bracket 498; and that spring biases the shaft 496 for clockwise rotation as that shaft is viewed in FIG. 29. However, that spring can yield to permit counter-clockwise rotation of that shaft.

A crank arm 506, which is equipped with a hub, encircles the shaft 496; and a fastener 508, shown as a set screw, is seated in the hub of that crank arm and locks it to the shaft 496. A push plate 510 is secured to the crank arm 506 by fasteners 511, shown in the form of screws. An elongated slot 513 is provided in the free end of the crank arm 506.

A crank arm 512 is provided with a hub that encircles the shaft 496; and a fastener 514, shown as a set screw, holds the crank arm 512 to the shaft 496. The free end of the crank arm 512 has a rod 516 projecting from it at right angles, and that rod is mounted so it can rotate relative to that crank arm. The mounting of rod 516 on crank arm 512 is emphasized in FIG. 23.

An elongated latch 518 is rigidly secured to the shaft 496, and that latch is immediately adjacent the inner face of the bearing bracket 320. A short projection 520, in the form of a pin, is carried by the latch 518 intermediate its ends. As indicated particularly in FIG. 30, the pin 520 is in the path of the collar 400 on the vertically movable sleeve 404. The normal and the raised positions of the projection 520 are shown by dotted lines in FIG. 29. A stop 524, in the form of a pin, is mounted on bearing plate 320, and that stop limits downward movement of the latch 318.

A flat plate 522 is secured to and rotates with the shaft 496. That plate is adjacent the upper end of the latch 518; and its normal position is shown by solid lines while its rotated position is shown by dotted lines. The plate 522 is in the path of the spring 422 on lever 420, as indicated in FIG. 29, whenever that plate is in its rotated position.

The numeral 526 denotes a vertical rod which is guided by aligned openings in the top and bottom of bracket 228; and an opening is provided in the platform 118 to accommodate the lower end of that rod. The rod 526 is disposed to the left of the rod 230, as those rods are viewed in FIG. 22. A rib 528 is provided on the upper end of the rod 526, and that rib has an ear extending at right angles from the plane of that rib, as shown by FIG. 22. In its normal position, as indicated by solid lines in FIG. 25, the ear on rib 528 is in the path of the projections 226 on the tank 148; but in its raised position, as indicated by dotted lines in FIG. 25, the ear on rib 528 is above the path of the projections 226 on tank 148. A pin 530 extends through the lower end of the rod 526, and that pin serves as a stop for the washer 532 which encircles the lower end of that rod. A helical compression spring 534 bears against the washer 532 and also bears against the bottom of the platform 118. That spring biases the rod 526 for movement to the position shown by solid lines in FIG. 25, but it can yield to permit the rod 526 to move upwardly to the dotted line position of FIG. 25.

A generally L-shaped lever 536 is secured to the free end of crank arm 506 by a fastener 538, shown in the form of a screw and nut combination. That screw and nut combination coacts with the slot 513 in crank arm 506 to enable the lever 536 to telescope upwardly along th shaft 350 when the crank arm 506 rotates in the counter-clockwise direction in FIG. 25.

The lower end of lever 536 telescopes over the shaft 350 and underlies worm gear 540. That worm gear is mounted on the shaft 350 adjacent the slot 351 in that shaft; and a set screw 542 extends through the worm gear 540 and lodges in the slot 351, as shown in FIG. 28. The slot 351 and the set screw 542 coact to permit the worm gear 540 to telescope vertically along the shaft 350 while holding that gear and shaft for conjoint rotation.

A guide and support 544 is shown in FIG. 24, and it is provided with two cylindrical openings at right angles to each other. One of those openings accommodates the vertical shaft 350, while the other of those openings accommodates the horizontal shaft 322. This guide and support will steady the two shafts intermediate their ends and will thus stabilize the operation of the film developing apparatus.

The numeral 546 denotes an elongated cylindrical rod which has one end thereof extending through an opening in the rod 516 on the crank arm 512; and that rod has the other end thereof supported by a bearing bracket 558. That bearing bracket extends downwardly from a right hand extension of a bearing bracket 321, as those brackets are viewed in FIG. 29. The rod 546 has a slot 545 therein adjacent the left hand end thereof, and that slot is shown in FIG. 23.

A T-shaped pin 548 is set in the slot 545 so the head of the T projects outwardly beyond the sides of that slot. The stem of the T of pin 548 telescopes into a helical compression spring 556 which encircles the left hand end of the rod 546. A washer 550 abuts the projecting portions of the head of the T-shaped pin 548, and one end of the spring 556 engages that washer. A washer 552 abuts the other end of the spring 556; and a nut 554 is threaded onto the left hand end of the rod 546 to maintain the washer 552, the spring 556, the washer 550 and the pin 548 in assembled relation with the rod 546.

A U-shaped yoke 560 is mounted on the other end of the rod 546, and that yoke rotates with that rod. That yoke has notches 562 adjacent the upper end of the arms thereof and has notches 564 adjacent the bottom ends of the arms thereof. A pin 566 is rotatably supported by one of the arms of the yoke 560, as shown in FIG. 57, and that pin rotatably supports a small plate 568. The plate 568 has a threaded opening in it, and that opening accommodates the threaded lower end of a rod 570. The upper end of the rod 570 has an opening in it, and a pin 576 connects the upper end of that rod with a generally horizontal lever 572. One end of the lever is fixedly secured to a rotatable shaft 578, and a weight 574 is threaded onto the other end of that lever. The shaft 572 is supported by the bearing bracket 320 and by a second bearing bracket, not shown; and that shaft has its axis parallel to the axis of the platform 118. A cam follower 584 is mounted on the outer end of the shaft 578, and that cam follower has a first arm 580 and a shorter arm 582.

The numeral 586 denotes a generally horizontal bar which is provided with flanges 588 and 590 at the opposite ends thereof. Those flanges are directed toward and can engage the notches 562 and 564 in the arms of the U-shaped yoke 560. The bar 586 is supported at its center by a shaft 592 which extends upwardly through an opening in the platform 118 and is guided and confined by a bracket 596, as shown in FIG. 24. A gear segment 594 is secured to the shaft 592, and that segment is disposed adjacent the upper face of the platform 118. Rotation of the bar 586 will cause rotation of the shaft 592 and thus of the gear segment 594.

A ring 598 telescopes over the sleeve 404, but the inner diameter of that ring is larger than the ouside diameter of that sleeve so the sleeve can move axially relative to that ring. The ring 598 has a notch in it, and that notch receives and confines the rib 406 on the sleeve 404; and the engagement between that notch and rib enables rotation of the ring 598 to cause a similar rotation of sleeve 404. The ring 598 has a number of teeth 600 on it, and those teeth mesh with the teeth of the gear segment 594. A radially extending finger 602 is formed on the ring 598, and that finger is spaced circumferentially from the teeth 600.

A U-shaped support 607 is mounted on the upper surface of the platform 118 immediately adjacent the sleeve 404, and that support has an upstanding arm 606 and a second upstanding arm 610. The arm 606 supports a set screw 608 and the arm 610 supports a set screw 612. The set screws 608 and 612 are in the path of the radially extending finger 602 on the ring 598; and those set screws limit the extent to which the ring 598 and thus the sleeve 404 can rotate. As indicated by solid and dotted lines in FIG. 31, the ring 598 and the sleeve 404 can be set in three circumferentially spaced positions.

The numeral 614 denotes a generally horizontal stop with an arcuate inner end. The radius of curvature of the inner end of the stop 614 is complementary to the radius of the sleeve 404. The stop 614 can fit under the rib 406 on the sleeve 404, as indicated particularly in FIG. 30, to prevent downward movement of the sleeve 404. An elongated bar 616 is secured to and movable with the stop 614, and that bar has an offset 617 intermediate the ends thereof. The bar 616 has a pin 626 projecting downwardly from the free end thereof, as shown in FIGS. 29 and 31. The stop 614 has a vertically depending flange at the outer end thereof, and that flange has an opening through it. A transversely directed portion of the bar 616 abuts the flange of stop 614, as indicated in FIG. 39, and that transversely directed portion has an opening aligned with the opening in that flange. A threaded rod 618 extends through the aligned openings in the flange of stop 614 and in the transversely directed portion of bar 616, and that rod is secured to the platform 118, as shown in FIGS. 37–39. The outer end of the rod 618 is provided with a washer 620 and a nut 622. A helical compression spring 624 encircles the rod 618; and one end of that spring bears against the washer 620 while the other end of that spring bears against the flange of stop 614. The spring 624 thus biases the stop toward the sleeve 404. The pin 626 on the bar 616 can be pushed to the left, as that bar is viewed in FIG. 29, to make the spring 624 yield and permit the stop to move out of the path of rib 406.

The numeral 630 denotes a bearing bracket which depends downwardly from the upper surface of platform 118. That bearing bracket is disposed to the left of the rod 526 as that rod is viewed in FIG. 24. A second bearing bracket 632 extends downwardly from the upper surface of platform 118, and that second bearing bracket is spaced a short distance to the right of the bearing bracket 320. The bearing brackets 630 and 632 rotatably support a horizontal shaft 628; and that shaft has a worm wheel 634 secured to it. The worm wheel 634 can be engaged and driven by the worm gear 540 whenever the crank arm 506 is rotated upwardly by the shaft 496. A spring 636 encircles the left hand end of shaft 628, as that shaft is viewed in FIG. 24, and that spring has one end thereof held by a pin 637 on the shaft 628 and has the other end thereof bearing against the bracket 632. The spring 636 thus biases the shaft 628 for rotation in the counter-clockwise direction, as that shaft is viewed in FIG. 29. A tripping cam 638 is mounted on the left hand end of shaft 628, as that shaft is viewed in FIG. 24; and a stop 640 is provided on the right hand end of that shaft. The stop 640 limits rotation of the shaft 628 in the counter-clockwise direction.

A shaft 642 extends between the bearing bracket 632 and the bearing bracket 321, and that shaft can rotate relative to those bearing brackets. A hook 644 is mounted on the shaft 642, and that hook will rotate with that shaft. A spring 646 encircles the shaft 642 and biases the hook 644 for rotation to the position shown in FIG. 29. However, that spring can yield to permit rotation of the hook 644 in the counter-clockwise direction. A trip 648 is secured to the shaft 642 at a point to the right of the hook 644, as that hook and trip are viewed in FIG. 24. The trip 648 has a horizontally directed arm 650 at the upper end thereof, and that arm is adjacent the offset 617 in the bar 616, as shown in FIG. 24. The lower end of the trip 648 is in the path of the tripping cam 638, and it can be rotated in the counter-clockwise direction by that cam.

The numeral 652 denotes a valve housing that is mounted on a bracket 654 which, in turn, is mounted on the plate 346 held by the rod 116. That housing has an inlet 656 adjacent the lower end thereof, and that inlet projects radially from that housing. An outlet 658 is provided adjacent the upper end of the housing 652, and that outlet projects radially from that housing. As indicated particularly in FIG. 58, the inlet 656 is intermediate the bottom of housing 652 and a partition 651 which has a tapered valve seat in it. The housing 652 has an internal thread 649 at the bottom thereof and has an inwardly directed flange 653 at the upper end of that thread. An externally threaded metal sleeve 655 is held by the thread 649; and it has a generally conical recess at its lower face. Packing 669 is squeezed into sealing engagement with that recess and with the threaded valve element 660 by a packing gland 662. The valve element 660 has a frusto-conical upper end and a slotted lower end; and that upper end can be moved toward or away from the tapered valve seat in partition 651 by inserting a screw driver blade in the slot at the lower end of that valve element. Such movement of the upper end of valve element 660 determines the maximum rate of flow through the valve housing 652. A tube or hose telescopes over the inlet 656 and that tube will be suitably connected to a mixing faucet or to a container of water having a predetermined temperature.

The valve housing has an upper partition 663 that is equipped with a tapered valve seat, and that partition is intermediate the partition 651 and the outlet 658. The upper end of the housing 652 has an internal thread and it has a flange at the lower end of that thread. The said thread accommodates an annular guide 665 that has an external thread. The guide 665 slidably guides and confines a valve element 664 which has a frusto-conical lower end and which has a threaded upper end. A nut 666 with a rounded bottom can be threaded onto the upper end of the valve element 664. Once the annular guide 665 and the valve element 664 have been assembled, that guide can be threaded into the valve housing 652 and threaded into engagement with the flange at the lower end of the upper internal thread of housing 652. Vertical movement of the valve element 664 will regulate the volume of water passing to the outlet 658. A tube or hose 659 will be telescoped over the outlet 658, and that tube will extend to the packing gland 224 shown in FIG. 7.

A combination flange and bracket 668 is provided at the upper end of the valve housing 652, and the bracket portion thereof has two upstanding walls which are spanned by a pivot 670. That pivot rotatably supports a lever 672 which has a slot 676 through it to receive the upper end of the valve element 664. In addition, the lever 672 has a second slot 674. One end of the lever 672 extends close enough to the sleeve 404 so it can be struck by the pin 412 on the collar 408 when the sleeve 404 rotates that pin into register with the lever 672.

The combination flange and bracket 668 has a threaded opening at each side thereof, and those openings are in register with openings in a packing gland 678. The lower end of that gland telescopes into the upper end of the valve housing 652 to compress the packing that encircles the valve element 664. A screw 667 extends through the opening at one side of the packing gland 678 and seats in one of the threaded openings of combination flange and bracket 668, while a threaded rod 680 extends through the opening at the opposite side of that gland. A nut is threaded onto the bottom of the rod 680 below the combination flange and bracket 668, and a nut 682 is threaded onto that rod above the gland 678. The screw 667 and the nut 682 coact to determine the extent to which the packing is compressed by the gland 678.

The rod 680 extends upwardly through the slot 672 and it has a knurled annulus 694 that serves as an adjustable stop for the clockwise rotation of lever 672. That stop determines the normal vertical position of valve element 664 and thereby determines the normal rate of flow of water to the outlet 658. The slot 674 in lever 672 is large enough to permit free counter-clockwise rotation of lever 672, and that rotation will raise the valve element 664 and increase the flow of water to the outlet 658.

The upper end of the rod 680 has a plate 686 threaded onto it, and a nut 688 locks that plate in position on that rod. The plate 686 overlies the upper end of valve element 664, and a screw extends downwardly through the free end of that plate. That screw and the upper end of the valve element 664 confine a helical compression spring 690 which biases the valve element 664 toward the valve seat in the partition 663 and biases the lever 672 toward the adjusting anulus 694.

In assembling the valve housing and its component parts, the valve element 660 is threaded into the central opening of annulus 655, packing is pressed into the sleeve on that annulus, and the gland 662 is then threaded onto that sleeve. The resilient ring is set adjacent the flange 653 and thereupon the annulus 655 is threaded into sealing engagement with that ring. The valve element 664 is telescoped through the central opening in the guide 665 and thereupon that guide is rotated down into engagement with the upper flange in the valve housing. Packing is then placed in the upper end of that valve housing and the gland 678 is telescoped down over the upper end of valve element 664 into engagement with that packing. The rod 680 and the screw 667 are assembled with the packing gland 678 and the combination flange and bracket 668, and the nuts 682 and 684 are mounted on rod 680. At this time, the adjusting annulus 694 is threaded onto the upper end of rod 680. The lever 672 can then be telescoped downwardly into position; its slots 676 and 674 receiving the valve element 664 and the rod 680 respectively. That lever will be held in position by setting the pivot 670 in position. Thereupon the nut 666 can be threaded onto the upper end of the valve element 664, the plate 686 can be mounted, and the spring 690 set in position. Suitable adjustments in the position of valve element 660 and of the knurled annulus 694 can then be made.

The numeral 696 denotes an electrical outlet box which is mounted on the rod 116. In the particular embodiment shown, the outlet box 696 is also used as a junction box; and wires, not shown, extend from the outlet box 696 into the hollow rod 116. Those wires extend upwardly through that rod and pass outwardly through the small diameter opening 119 in the platform 118; and those wires extend to the terminals of the switch 278. Other wires extend to a single pole double throw switch 806 mounted on bearing bracket 320 adjacent the cam disc 338. The outlet box 690 has a single pole single throw switch 698, and it has two female receptacles 700 and 701. A suitable source of electric current can be connected to the outlet box 696 by leads, not shown.

The electrical circuit of the film treating apparatus is shown in FIG. 52. When the single pole single throw toggle switch 698 is "open," the entire circuit is inactive. When the switch 698 is "closed" and the movable contact of switch 806 is in the position shown in FIG. 52, the motor 362 will be energized. When the movable contact of switch 806 is shifted to its other position, the motor 362 will be de-energized and the receptacle 700 will be connected across the line. When the switch 278 is "closed," the receptacle 701 will be connected across the line.

The upper end of the shaft 378 has a reduced diameter section 381, as shown in FIG. 4, and that section carries a worm gear 702. A fastener shown in the form of a pin secures that gear to that section of shaft 378. The worm gear 702 is enclosed and protected by a closure 704 which has a vertically directed, cylindrical portion and which has a horizontally directed, cylindrical portion; and the two portions of that closure are generally tangential. The vertically directed, cylindrical portion of the closure 704 telescopes into the upper end of the sleeve 404, and it is held by a fastener shown as a set screw in FIG. 4. A cap 706 is provided for the upper end of the vertically directed, cylindrical portion of closure 704, and that cap is held by a fastener shown as a set screw.

A horizontal shaft 708 is mounted in the horizontally directed cylindrical portion of closure 704; and that shaft is supported by bearings carried by that portion. A worm wheel 710 is mounted on the shaft 708, and that wheel meshes with and is driven by worm gear 702. A cutaway bevel gear 712 is mounted on the right hand end of shaft 708, and that gear is disposed outwardly beyond the end of the horizontally directed cylindrical portion of the closure 704. A ratchet 714 is mounted on the left hand end of shaft 708, and that ratchet is disposed outwardly beyond the end of the horizontally directed cylindrical portion of the closure 704. A bracket 715 is secured to the horizontally directed cylindrical portion of the closure 704, by fasteners shown as screws; and that bracket carries a pivot 718 for a pawl 716. That pawl is biased into engagement with the ratchet 714 by a spring 720 which encircles the pivot 718 and bears against the bracket 715 while also bearing against the pawl 716. The pawl 716 prevents rotation of the shaft 708 in the clockwise direction, as that shaft is viewed in FIG. 4.

A U-shaped bracket 722 is secured to the right hand end of the horizontally directed cylindrical portion of the closure 704. That bracket encloses the cut-away bevel gear 712 on the outer end of shaft 708; and it also supports a vertical shaft 724. That shaft has a collar 726 on the upper end thereof, and that collar has a radially projecting arm. In addition, the shaft 724 has a bevel gear 728 mounted thereon that can be engaged and driven by the cut-away bevel gear 712 on shaft 708. The gear 712 has been cut away so it can rotate a number of degrees before it engages the bevel gear 728, and so it can then rotate out of engagement with that gear. In doing so, the gear 708 provides intermittent rotation of the vertical shaft 724. A helical spring 730 encircles the shaft 724, and one end thereof is held by a pin on shaft 724 while the other end is held by the bracket 722. As a result, the spring 730 biases the shaft 724 for rotation in the counterclockwise direction as that shaft is viewed in FIG. 3. The gear 712 will rotate to engage the gear 728 and rotate the shaft 724 in the clockwise direction, but as soon as the cut-away portion of the gear 712 frees the gear 728, the spring 730 will return the shaft 724 to the position shown in FIG. 3. The bracket 722 has an upwardly directed ear 734 thereon adjacent the projecting arm on the collar 726, and a set screw 736 is carried by that ear. The set screw 736 can be adjusted to determine the normal position of collar 726 and thus of shaft 724; and the spring 730 will bias that collar and shaft to that position.

The bracket 722 has a projection 738 adjacent the bottom thereof, as shown in FIG. 3, and that projection has a threaded opening which receives a screw 740 with a large diameter pressure face at the bottom thereof. Rotation of the screw 740 relative to the bracket 738 will determine the vertical position of the pressure face on that screw. The pressure face 740 can be moved into register with the rod 208 carried by the tank 148, when that tank has been moved to a predetermined position and when the sleeve 404 has been rotated to a predetermined position. When this happens, the pressure face on the screw 740 will engage and force the rod 208 downwardly as the sleeve 404 moves down into engagement with the collar 400 on shaft 378.

The lower end of the rod 724 supports a sleeve 732, and that sleeve is disposed below the level of the bracket 722. That sleeve has a pin projecting radially from it. The sleeve 732 is affixed to the shaft 724 so it can not rotate relative to that shaft.

Referring particularly to FIGS. 11–18, the numeral 742 denotes a rod with a large diameter upper end, with a small diameter lower end and with threads at the bottom thereof. A fastener 744, shown as a screw, is seated in the upper end of the rod 742, and that fastener extends through an opening in a sleeve 746 which telescopes downwardly onto the upper end of that rod. Consequently, that fastener holds the sleeve 746 and the rod 742 for conjoint rotation. The sleeve 746 has a skirted flange thereon, and hence the sleeve 746 constitutes a cover as well as an attaching sleeve. An L-shaped slot 748 is provided in the upper end of the sleeve 746, and that slot accommodates the pin on the sleeve 732 of shaft 724. The slot 748 of sleeve 746 and the pin on sleeve 732 coact to constitute a bayonet joint that assures ready securement and ready separation of the sleeves 732 and 746.

A sleeve 750 that is provided with a pair of vertically spaced spiral film guides is telescoped upwardly over the small diameter lower end of the rod 742. The upper end of the sleeve 750 will abut the shoulder between the large diameter section and the small diameter section of rod 742. A generally similar sleeve 752 with vertically spaced spiral film guides is telescoped up over the lower end of the rod 742. The sleeve 752 differs from the sleeve 750 by having an internal thread at the lower end thereof, and that internal thread coacts with the thread at the bottom of the rod 742 to lock the sleeves 750 and 752 in position on that rod. The rod 742 and the sleeves 750 and 752 constitute a film rack for "still" film, usually thirty-five millimeter film. If it is desired to treat wider or narrower film, other sleeves with appropriately spaced film guides will be substituted for the sleeves 750 and 752. Where wider film is to be treated, just one sleeve will be mounted on the rod 742.

The numeral 754 denotes a cylinder which has an inwardly directed offset at the bottom thereof, as shown in FIG. 18. A disc 756 is dimensioned to fit within the opening defined by the offset at the bottom of the cylinder 754; and an annulus 758 of yielding material, as for example, rubber is held immediately adjacent the under side of disc 756 by a disc 760. The disc 760, the annulus 758 and the disc 756 constitute a light-sealing element for the bottom of the cylinder 754. The disc 760 has a central opening and has two diametrically opposed openings 762, as shown in FIG. 15. A screw 764 is carried by the disc 756, and that screw extends downwardly through the annulus 758 and through the central opening in the disc 760. A number of fasteners 766, shown in the form of screws, extend through openings in the disc 760 and seat in the disc 756. The openings in the disc 760 which accommodate the screws 766 are large enough to permit the discs 756 and 760 to move relative to each other. The cylinder 754 receives the film rack and thus constitutes a film cartridge.

An elongated sleeve 768 has a flange 770 at the upper end thereof, and that flange can abut the under side of the disc 760. The sleeve 768 also has a lower flange 772 which serves as a handle. Further, the sleeve 768 has an internal shoulder adjacent the upper end thereof, as shown in FIG. 16. Pins 774 are carried by the flange 770 on sleeve 768, and those pins can extend into the openings 762 in the disc 760.

An elongated rod has a small diameter portion 773 that fits into the portion of sleeve 768 below the internal shoulder, and it has a larger diameter portion 776 that fits into the portion of sleeve 768 above that shoulder. The portion 776 has a threaded recess that can accommodate the screw 766 of the light-sealing element whenever the upper end of rod 776 is set in register with an adjacent to the central opening of disc 760. The portion 773 has a thread 778 that can receive a plate 784 and a nut 786. When the nut 786 is tightened onto the thread 778 it enables the rod and the plate to rotate as a unit relative to the sleeve 768.

The sleeve and the rod constitute a manipulator for the light-sealing element; and by proper handling of that manipulator that element can effectively seal the bottom of cylinder 754. For example, the pins 774 can be set in the openings 762 while the portion 776 is threaded onto the screw 766 carried by disc 756. The flange 772 can be gripped with one hand and the plate 784 can be gripped with the other; and rotation of that flange and plate can pull the plates 756 and 760 toward each other, thereby squeezing the yielding annulus 758 and forcing it to enlarge its outer diameter. That enlargement enables that annulus to engage the offset at the bottom of the cylinder 754 and form a light-tight seal. The bottom of cylinder 754 is sealed in this way, and the top of that cylinder is sealed by the flanged sleeve 746; and hence the cylinder 754 constitutes a light-tight film cartridge.

The numeral 788 denotes a cylindrical rod which is secured to the right hand end of the platform 118, as that platform is viewed in FIG. 3; and that rod extends vertically upwardly from that platform. That rod extends through an opening in a bracket 789 on a cover 790 for the film treating apparatus. The engagement between the rod 788 and the bracket 789 on the cover 790 confines and guides that end of cover 790. A shoulder 791 is provided on the rod 788 to give vertical support to that end of the cover 790.

The cover 790 is partially cylindrical and partially triangular in plan, as shown in FIG. 2, and it telescopes down over the outside of the upper end of the tank 148, over the outside of the flange 391 and inside the upwardly bent edges of the generally triangular plate 390. Cloth or other yieldable material is provided on outer face of the flange 391 and on the inner face of the upwardly bent edges of plate 390 to engage the cover 790 and prevent the passage of light therebetween. The engagement between the cover 790 and the band 218 on tank 148 prevents light leakage at that joint but it does not keep the tank 148 from rotating relative to the cover 790.

A bracket 792 is suitably secured to the top of the cover 790 by a fastener 793, shown as a knurled bolt. That bracket is close to the longitudinal center of the cover 790, and it supports a motor 800. An exhaust duct and housing 794 is secured to the motor 800 and to the cover 790 adjacent the cylindrical end of that cover. A hinge 796 is provided on the housing 794, and that hinge supports a door 798. That door will be provided with a suitable sealing material to enable it to provide a light-tight connection with the housing 794. The motor 800 has a shaft 802 with an internal thread at its outer end; and that shaft supports a fan 804 which rotates within the housing 794 and can draw air upwardly through the cover 790. A screw 801 is carried by the door 798, and that screw is in register with the internal thread of shaft 802. That screw can be engaged by that internal thread by holding the door 798 adjacent the housing 794 and rotating the projecting rear end of shaft 802 in a direction opposite to its normal direction of rotation. The motor 800 can be connected to the normally open contacts of the single pole double throw switch 806 by a male plug which extends into the receptacle 700 of outlet box 696.

The numeral 808 denotes a clamp which has alligator jaws, and which has a spring that holds it in position on the stem 110. That clamp supports an electrical socket 810 which carries a lamp 812. The socket will have leads extending from it, and those leads will have a male plug which can be inserted in the receptacle 701 of the outlet box 696.

The cam-supporting disc 338 can be equipped with one or more of the slotted cams shown in FIGS. 42 through 47; and it bears the stop shown in FIG. 48. The stop is denoted by the number 814, and it is permanently secured to the disc 338. The cams are releasably secured to the disc 338 by having slots that interact with radial slots in that disc.

The cam 816 has a slot 818 to interact with the slots of cam-supporting disc 338, it has an upper left hand edge 820 to engage the arm on the cam follower 472, it has an upper right hand edge 822 to engage the projecting arm of cam follower 288, and it has an edge 824 that passes above the arms 580 and 582 on the cam follower 584. As a result, the cam 816 will move cam follower 472 and will move cam follower 288 but will not move cam follower 584.

Cam 826 has the slot 818, the upper left hand edge 820, and the upper right hand edge 822 of cam 816, but it has an edge 828 that will engage the arm 580 on the cam follower 584. As a result, cam 826 will move all three cam followers 472, 288 and 584; and it will cause the cam follower 584 to raise the lever 572 to its uppermost position.

Cam 830 has the slot 818 and the upper left hand edge 820 of cam 816, but the upper right hand edge 822 has been cut away. In addition, the edge 828 has been cut away to leave a narrower and higher edge 832. This latter edge will engage the arm 582 of cam follower 584 but will not engage the arm 580 of that cam follower. Consequently, the cam 830 will only engage cam follower 472 and 584, and it will cause the cam follower 584 to raise the lever 572 to its intermediate position.

The cam 834 has the slot 818, the upper left hand edge 820 and the upper right hand edge of cam 816, and it has the edge 832 of cam 830. Consequently, the cam 834 will engage all three cam followers 472, 288 and 584, and it will cause that latter cam follower to raise the lever 572 to its intermediate position.

The cam 836 has the slot 818 and the upper left hand edge 820 of the cam 816, but the upper right hand edge 822 has been cut away. That cam also has the edge 828 of cam 826. As a result, cam 836 will only actuate cam followers 472 and 584, but it will cause the cam follower 584 to raise the lever 572 to its uppermost position.

The cam 838 has the slot 818 and the upper left hand edge 820 of cam 816, but the edges 822, 828 and 832 are not present. As a result, the cam 838 will move only the cam follower 472.

The cam follower 472 acts through the shaft 470, the lever 482, the end-face cam 264, the cam follower 488, and the rod 450 to shift the levers 446 and 458 and insert the pin 466 in the thread 377 of shaft 378. As indicated by FIG. 51, the thread 377 has a horizontally directed groove 375 contiguous with its leading edge. That thread extends upwardly to a point a short distance below the reduced diameter section 381 of shaft 378. The upper end of the thread 377 gradually extends outwardly to the outer face of shaft 378, as shown in FIG. 59; and in doing so it is able to force the pin 466 out of the path of the thread 377.

The portion of shaft 378 that has the thread 377 in it is confined throughout its length by the sleeve 405. That sleeve can rotate relative to the sleeve 404, and it permits the shaft 378 to rotate relative to it. The sleeve 405 moves upwardly and downwardly with sleeve 404, and it steadies the upper end of shaft 378 when the closure 704 disengages itself from the upper end of that shaft.

The shaft 378 has a collar 383 secured to it by a fastener shown in the form of a pin; and that collar is disposed a short distance below the reduced diameter neck 375. That collar constitutes a bearing for the center of the shaft 378 and thereby steadies that shaft as the sleeve 404 telescopes relative to that shaft.

A second, and longer, reduced diameter neck 385 is provided in the shaft 378, as shown in FIG. 51. That neck is contiguous with the upper end of the thread 379; and that neck is in register with the pin 426 whenever the bracket 414 is in the position shown by dotted lines in FIG. 29. This enables the pin 426 to enter the reduced diameter neck 385 while the sleeve 404 is held against downward movement by the interaction of stop 614 and rib 406. When the stop 614 is withdrawn, the sleeve 404 moves downwardly a short distance until the pin 426 is held by the portion of shaft 378 that defines the lower edge of neck 385; and almost immediately thereafter the thread 379 starts the pin 426 and the sleeve 404 downwardly to the position shown in FIG. 1.

The rate of rotation of shaft 378, and of all other rotating parts of the film treating apparatus, can be varied by shifting the pointer 359 relative to the dial 361 of FIG. 53. When the pointer is adjacent the numeral "0," the cam-supporting disc 338 will make one revolution every eighty minutes. When the said disc is rotating at that speed, the time required for that disc to move the distance between adjacent slots of that disc will be substantially one minute. This is desirable because it makes it easy to set the various cams to provide film treatments of the desired duration. For example, if the last step in the processing of a film is a washing step of eight minutes, it is a simple matter to select the appropriate cam and set it in the eighth slot ahead of the stop 814.

In the event it is desired to increase the length of time of the film treating cycle, and thereby obtain a denser film, it is a simple matter to shift the pointer 359 in the clockwise direction in FIG. 53 and thereby slow down the motor 362. That shift will provide any desired increase in length of film treating cycle, and a corresponding decrease in the speed of motor 362, up to fifty percent. On the other hand, if a shorter film treating cycle is desired, the pointer 359 can be shifted in the counter-clockwise direction to increase the speed of the motor 362; and here again, a change up to fifty percent can be attained.

FIGS. 11–14 show a film rack for "still" pictures, but the film treating apparatus of the present invention is not limited to use with such pictures. Instead, that apparatus can be used to treat motion picture film; and a film rack for such film is shown in FIGS. 49 and 50. That rack has a flanged sleeve 746 that is interchangeable with the similarly numbered sleeve of FIGS. 11–14. The flanged sleeve 746 of FIGS. 49 and 50 has an L-shaped slot 748 which can accommodate the pin on the sleeve 732.

The flanged sleeve 746 of FIGS. 49 and 50 supports an elongated rod 840; and that rod supports two vertically spaced spiders. Each of those spiders includes a hub 842, circular discs 844 on the hub, vertical plates 846 extending radially outwardly from the discs 844, circular discs 848 on the outer ends of the plates 846, and ribs 850 on the discs 848. The two spiders are staggered, as shown in FIG. 49, and the motion picture film can be threaded onto those spiders as indicated by dotted lines in FIG. 49. The discs 844 and 848 will support the film at points spaced outwardly from the "frames" of the film, and thus the film-treating solutions will have full access to those frames. The ribs 850 will keep the turns of the motion picture film from slipping off of the discs 844 and 848.

The solutions used in treating the film can be cooler than the ambient temperature, and this is particularly true where the film treating apparatus is used in the summer. The relatively low temperatures of the solutions will reduce the temperature of the tank 148 to the point where moisture in the air can condense in that tank. The condensed moisture could be a hazard to the lamp 812 used in the "reversing" process, because that lamp can get quite hot and could be cracked by being struck by cool condensate. Accordingly, an open frame 852 is mounted on the stem 110 above the level of, but in register with, the lamp 812; and that frame has a sheet 854 of transparent material overlying the lamp. Any condensate that might otherwise drip onto the lamp 812 will strike the sheet 854 and be deflected away from that lamp.

The lamp 812 is held generally in register with the switch 278. When the tank 148 is rotated to the point where the rod 208 carried thereby is substantially in register with the actuator of switch 278, and when the closure 704 is rotated to the uppermost dotted-line position in FIG. 3, the rod 208 can engage the latch 204, as shown in FIG. 54. That engagement will rotate that latch downwardly, thereby freeing the ear 206 on the ring 190 and moving the downwardly directed abutment on the latch 204 into engagement with the actuator of switch 278. The freeing of the ear 206 on the ring 190 will permit that ring to move to the position of FIG. 9; and that ring will abut and be held by a yieldable, bowed bumper 856 carried by a plate 858. That plate depends downwardly from the bottom of tank 148, and the bumper will preferably be of rubber. The engagement of latch 204 with the actuator of switch 278 will illumine the lamp 812; the male plug on the leads from that lamp being in the receptacle 701.

In using the film treating apparatus provided by the present invention, the operator first fills the solution-containing receptacles 174 with the chemicals recommended by the manufacturer of the film. For purposes of illustration, it will be assumed that the operator wishes to develop "Ektachrome" film made by the Eastman Kodak Company. The receptacle 174 that is denoted by the letter A in FIG. 3 will be filled with First Developer, receptacle B will be filled with Hardener, receptacle C will be filled with Color Developer, receptacle D will be filled with Clearing and Fixing Bath, receptacle E will be filled with Bleach, and receptacle F will be filled with Stabilizer. These various solutions are obtainable at photographic supply stores, and they can be poured into the appropriate receptacles.

Prior to the time these solutions are poured into the receptacles 174, those solutions should be kept at the temperatures recommended by the supplier; and thereafter, those solutions will be kept at those temperatures by the water that fills the spaces in tank 148 between the receptacles 174. That water can be supplied by a mixer faucet which receives water from a "cold" water line and from a "hot" water line and then directs the resultant mixture through a hose to the inlet 656 of the valve housing 652. That water can also be supplied by a large container, such as a canvas bucket, which is filled with water at the desired temperature and which has an outlet connected to the inlet 656 by a hose. That container would be set above the level of the tank 148 so that the water will flow by gravity. The water, whether from a mixer faucet or from a container, will rise upwardly through the valve housing 652, will pass outwardly through outlet 658, and will enter packing gland 224 and rise upwardly through tube 220 into the tank 148; the operator using his finger to depress the left hand end of lever 672 to raise the valve element 664 or rotating the knurled disc 694 to raise the right hand end of lever 672 or shifting sleeve 404 to cause the collar 408 thereon to depress the left hand end of lever 672. If desired, the operator can keep the lever 672 in valve-opening position until enough water has passed through the overflow openings 152, annular overflow passage 150, overflow tube 154, sleeve 132 and closure 122 to make sure that the tank 148 has itself reached the temperature of the water.

To fill the receptacles 174, the operator removes the cover 790; but that is easily done since that cover is held in position by gravity. Moreover, if the film treating apparatus had been used recently, the cover 790 might already be removed; that cover having been removed to permit the film that was previously treated by the apparatus to be removed.

The normal starting position of the film treating apparatus provided by the present invention is shown in FIG. 3. In that position, the sleeve 404 has rotated the closure 704 until the shaft 724, carried by the bracket 722 on that closure, is concentric with the sleeve 178 and the cylinder 754. The said apparatus will usually be in that normal starting position; but if it is not, the desired positioning of the tank 148 and of the closure 704 can be attained by proper manipulation of the cam followers while the motor is running. The user of the apparatus will then grasp the closure 704 to raise the sleeve 404 upwardly. This raising of the sleeve 404 can be accomplished easily because the spring 462 holds the pin 466 out of thread 377 and the spring 428 holds the pin 426 out of thread 379. When the sleeve 404 approaches the upper end of its limit of travel, the collar 408 thereof engages the projection 520 on latch 518 and rotates that latch, thereby rotating the plate 522 to the position shown by doted lines in FIG. 29. That plate intercepts the spring 422 on L-shaped lever 420, thereby rotating that lever in the counter-clockwise direction and forcing the pin 426 into the reduced diameter neck 385 of shaft 378. As the sleeve 404 reaches the upper end of its limit of travel, the lower end of rib 406 will move up above the stop 614, and thereupon the spring 624 will push the stop 614 into position to hold the rib 406 and the sleeve 404 against downward movement.

The film cartridge, including the flanged sleeve 746, the cylinder 754, the rod 742, the sleeves 750 and 752, and the light-sealing element, is then separated from the sleeve 732, unless that cartridge was separated from that sleeve at the end of a prior film treating operation. That film cartridge will thereupon have the yieldable annulus 758 of the light-sealing element inserted into its lower end and squeezed into light-tight engagement with the offset of cylinder 754 by proper use of the manipulator consisting of rod 773—776 and sleeve 768. Once this has been done, the film cartridge should be taken to a dark room, the film rack removed from the cylinder 754, and the film threaded into the spiral film guides of the sleeves 750 and 752. Once this has been done, the film rack is replaced within cylinder 754; and at such time the film cartridge can be taken back out into the light because that film cartridge is light-tight and will adequately protect the film.

The sleeve 768 and the rod 773—776 of the manipulator will be projecting downwardly from the disc 760 of light-sealing element, and that sleeve and rod will be telescoped down into the open upper end of the sleeve 178. The downward movement of the manipulator and film cartridge will be continued until the upper end of the flanged sleeve clears the bottom of the sleeve 732. Once this has been done, the sleeves 732 and 746 can be interconnected; and thereafter the film rack will move as a unit with the shaft 724. The bayonet joint defined by the L-shaped slot 748 in sleeve 746 and the pin on sleeve 732 will usually be able, by itself, to prevent accidental separation of the film rack from the oscillating shaft 724. However, if that bayonet joint needs further help in resisting any such accidental separation, a helical compression spring can be lodged in the upper end of sleeve 746; and that spring will augment the gravitational force that holds the upwardly directed inner end of the horizontal arm of L-shaped slot 748 in holding engagement with the pin of sleeve 732.

The operator then pushes the pin 626 to the left, as that pin is viewed in FIG. 29, thereby moving the stop 614 out from under the rib 406 on sleeve 404. This permits that sleeve to drop down a short distance until the pin 426 engages the lower edge of the neck 385. The operator then raises upwardly on the outer end of plate 432 to permit the spring 428 to withdraw the pin 426 from the path of thread 379, thereby freeing the sleeve 404 for downward movement. The operator will hold onto the closure 704 to regulate that rate of movement and to make sure that the greater part of the length of sleeve 768 of the manipulator passes through the ring 190. The operator then replaces the cover 790.

If the operator does not wish to raise the sleeve 404 by physically grasping the closure 704 and pulling upwardly on it, and if he does not wish to trip the stop 614 and the plate 432, he can attain the same results by proper manipulation of the cam followers. All that is needed is that the film cartridge be rendered light-tight at the bottom, be loaded with film and rendered light-tight at the top, be secured to the sleeve 732, and be lowered down into the sleeve 178 with the manipulator partially extending through ring 190; and that the cover 790 be set in position. This can be done wholly by hand or in part by manipulation of the cam followers.

At this time, the operator will grasp the plate 784 of the manipulator and pull down; thereby pulling the light-sealing element down onto the shoulder 192 of the ring 190, and pulling the cylinder 754 down onto the shoulder 182 formed by the internal flange 184 of sleeve 178. When the light-sealing element is seated in the ring 190 it will coact with that ring to prevent the leakage of light into the sleeve 178, and through the sleeve 178 into the tank 148. If the initial engagement between the resilient annulus 758 and the offset of cylinder 754 is too tight to permit the light-sealing element to move out of engagement with that offset and onto the shoulder 192 of ring 190, that initial engagement can be loosened by rotating the plate 784 a few degrees relative to the handle 772. Once the light-sealing element is seated in the ring 190, the plate 784 can be rotated freely relative to the handle 772 to free the manipulator from the light-sealing element.

The requisite time cycle for the film treating operation is then pre-set for the film treating apparatus by mounting the appropriate cams on the cam disc 338. Those cams are set progressively ahead of the fixed stop 814, and that stop is set a few degrees rearwardly of a cam that will place the film rack in the sleeve 178. In the film treating cycle for "Ektachrome" film recommended herein, that cam will be a cam 826. The remaining cams are spaced ahead of that cam, and they are spaced from each other to provide the proper timing of the various steps. For example, the last step in the treatment of "Ektachrome" film, prior to the drying of that film, is to "stabilize" it for one minute; and therefore a second cam 826 is secured to the cam-supporting disc 338 in the slot immediately ahead of the cam 826 that will place the film rack in sleeve 178. The step that is prior to the "stabilizing" step is a wash step of eight minutes duration; and hence a cam 834 will be set in position on the cam-supporting disc 338 at a point which is eight slots in advance of the "stabilizing" cam 826. The step prior to this "wash" step consists of "fixing" the film for three minutes; and a cam 826 will be set in the third slot ahead of the slot that supports the cam 834. The step that precedes the "fixing" step is a one minute "rinse" step; and a cam 834 is set in the slot of cam-supporting disc 338 which is just ahead of the slot containing the "fixing" cam 826. The step that precedes the "rinse" step is an eight minute "bleaching" step, and a cam 816 is therefore set ahead eight slots. The next preceding step is a "rinse" step of from not less than thirty seconds to not more than ninety seconds, and a cam 830 will be set in the slot just ahead of the "bleaching" cam 816. A "clearing" step of five minutes duration precedes the thirty to ninety second "rinse," and a cam 816 will be set five slots ahead of the "rinse" cam 830. A "wash" of five minutes precedes the "clearing" step, so a cam 830 will be set five slots ahead of the "clearing" cam 816. The "color development" step requires fifteen minutes, and therefore a cam 838 is set fifteen slots ahead of the "wash" cam 830. Prior to the "color development" step, a three minute "wash" step is required, and hence a cam 830 is set in the third slot in advance of the cam 838. The three minute "wash" step is preceded by a one minute "reversal exposure" step, and a cam 826 is set in the slot immediately ahead of the cam 830 for the three minute "wash." A "hardening" step of from three to ten minutes duration precedes the "reversal exposure" step, and therefore a cam 816 is set seven slots ahead of the cam 826. A one minute "rinse" precedes the "hardening" step, and therefore a cam 830 is set one slot ahead of the "hardening" cam 816. The "first developer" cam 816 is set ten slots ahead of the one minute "rinse" cam 830. This means that the "color development" cam 816 is sixty-nine slots ahead of the cam 826 that shifts the film rack into the sleeve 178; and when the pointer 359 is set adjacent the numeral "0" on motor dial 361, those sixty-nine slots will cause the film treating operations to consume sixty-nine minutes. If the pointer 359 is rotated in the clockwise direction relative to dial 361 to a point that provides a fifty percent increase in the duration of the time cycle, the film treating operation will require one hundred and four minutes. If the pointer 359 is rotated in the counter-clockwise direction to a point that provides a fifty percent decrease in the duration of the time cycle, the film treating operation will consume thirty-four minutes. As the pointer 359 is shifted in the clockwise or counter-clockwise direction, it will cause a change in the duration of each individual step as well as in the duration of the overall film treating operation.

The cam 836 was not needed for the recommended sequence of steps used in developing "Ektachrome" film, but that cam is available for use in other film treating sequences. By proper selection and setting of the various cams, the operator can develop any film for which solutions and instructions are publicly available.

Once the timing cycle has been pre-set by mounting the various cams in the slots of the cam-supporting disc 338, the plate 336 is loosened sufficiently to permit the "first developer" cam 816 to be set immediately adjacent the cam followers 472 and 288. The operator will then adjust the position of the knurled annulus 694 on the rod 680 at the valve housing 652 to establish the desired "normal" flow of water; and then he will shift the switch 698 to the "on" position.

The knurled annulus 694 will be set at different positions depending on the ambient temperature. Thus, in the summer, that annulus will have to be set higher than it will be set in winter; because in the summer it will require more cool water passing through tank 148 to keep the solutions cool. A small thermometer can be mounted on the housing 148 to guide the operator in setting the knurled annulus 694.

When the switch 698 is shifted to the "on" position, the motor 362 will be energized, as shown by the circuit diagram of FIG. 52. That motor will rotate the sprocket pinion 364, and that pinion will drive the sprocket gear 358 and the shaft 350 through the sprocket chain 366. Through the sprocket pinion 356 on shaft 350, and through sprocket chain 382 and the sprocket gear 380, the shaft 378 will be rotated.

Rotation of the shaft 350 causes rotation of the worm gear 354 carried by the upper end of that shaft, and it also causes rotation of the worm gear 540 which is secured to that shaft by the pin 542 and slot 351. Rotation of the worm gear 354 causes rotation of the worm wheel 262 and shaft 254 on which that wheel is mounted. The worm gear section 258 of the combined worm gear and cam, and the sprocket pinion 256 on shaft 254, will thus be caused to rotate, thereby respectively causing rotation of worm wheel 314 and of sprocket pinion 270; the sprocket pinion 256 driving sprocket pinion 270 through sprocket chain 274. Rotation of sprocket pinion 270 will rotate shaft 268 and the bevel gear 272 thereon; and bevel gear 138 will rotate with the bevel gear 272. The bevel gear 138 is free to rotate relative to the sleeve 132 and relative to the disc 140 of cork; that gear merely encircling that sleeve. The tank 148 will tend to rotate with the bevel gear 138, because of the frictional engagement between that gear and the cork disc 140, but the rod 230 will be in the path of one of the projections 226 on the tank 148, as emphasized in FIG. 6; and that rod and projection prevent rotation of the tank 148. Consequently, the tank 148, the sleeve 132, the flanged sleeve 142 and the disc 140 will remain stationary event though the bevel gear 138 rotates continuously.

The rotation of worm wheel 314, by the rotation of the worm gear section 258 on shaft 254, rotates the shaft 312 and thus rotates the worm gear 318 on the lower end of that shaft. That worm gear meshes with and drives the worm wheel 332 which is mounted on the shaft 322; and hence shaft 322 rotates to rotate the cam-supporting disc 338. The motor speed is geared down greatly before it is applied to the cam-supporting disc 338. Thus, an initial reduction in speed is attained by using the small sprocket pinion 364 and the large sprocket wheel 358, and a further and greater reduction in speed is attained by using the worm gear 354 to drive the worm wheel 262. Further reductions in speed are attained by having the worm wheel 262 drive the worm gear 258, having the worm gear 258 drive the worm wheel 314, having the worm wheel 314 drive the worm gear 318, and having the worm gear 318 drive the worm wheel 332 on shaft 322. The motor 362 is a variable speed, governor-equipped motor; and the gear reduction is such that its lowest speed, the motor 362 can rotate the cam-supporting disc 388 through one complete revolution every one hundred and sixty minutes. At its highest speed, the motor 362 can effect one complete revolution of that disc every forty minutes. The normal speed of the motor 362 will rotate the disc 338 once every eighty minutes, and that speed is established by setting the pointer 359 adjacent the numeral "0" on the dial 361.

The rotation of cam-supporting disc 338 soon brings the "first developer" cam 816 into egagement with the arms of cam followers 288 and 472; the engagement between that cam and the arm of cam follower 288 preceding the engagement between that cam and the arm of cam follower 472 by a fraction of a minute. The cam followers 288 and 472 will rotate in the clockwise direction, as those cam followers are viewed in FIG. 1. The rotation of cam follower 288, and of the shaft 282 on which it is supported, will rock the vertical lever 290 in the clockwise direction until it pulls the pin 296 from the solid line position to the dotted line position of FIG. 26. In doing so, that vertical lever moves that pin into register with the projection 302 on the cam follower 300; and on the next revolution of shaft 254, the cam section 260 of the combined worm gear and cam will force the cam follower 300 to rotate in the counterclockwise direction about the pin 296 and thereby force the rod 230 down out of register with the arrested projection 226 on tank 148. Thereupon that tank will respond to the frictional forces, exerted on the flange sleeve 142 by the constantly rotating bevel gear 138, to move a short distance in the clockwise direction; that tank stopping when the momentarily freed projection 226 thereon engages the ribs 528 on the rod 526.

The clockwise rotation of the cam follower 472, which takes place a fraction of a minute after cam follower 288 rotates, moves the vertical lever 482 from the position shown in FIG. 31 to a position immediately adjacent the stop 484. Shortly thereafter, the end face cam 264 on the shaft 254 drives the arcuate surface 492 on the element 488 toward the vertical wall of the bracket 442 and thus drives the ear 490 on that element toward that vertical wall. That ear will strike the vertical lever 482 and bodily move that lever toward the vertical wall of the bracket 442, thereby causing that lever to force the rod 450 outwardly. The resulting outward movement of rod 450 rocks the lever 446 about the pivot 444 on bracket 442, and snaps the lever 458 toward the shaft 378. This movement of lever 458 places the pin 466 in the entering portion 375 of the thread 377; and almost immediately thereafter that thread and pin will interact to drive the sleeve 404 upwardly. As that sleeve moves upwardly, it carries the film rack upwardly within the cover 790; that film rack rising upwardly from, and out of, the cylinder 754 while that cylinder remains in position in the sleeve 178.

As the sleeve 404 continues to move upwardly, the collar 408 thereon will engage the projection 520 on the latch 518, as indicated particularly in FIG. 30; and in doing so that collar will rock that latch, and shaft 496, in the counter-clockwise direction. Such rotation of shaft 496 accomplishes a number of things almost simultaneously. Thus, shaft 496 rotates plate 522 from the solid line position to the dotted lines position of FIG. 29, it rotates the crank arm 512 to draw the rod 546 to the left, and it rotates crank arm 506 to (a) raise the L-shaped lever 536 and the worm gear 540 resting on that lever and (b) enable the push plate 510 to raise rod 526. The collar 408 on sleeve 404 continues to rotate the latch 518 upwardly until the inclined face on the free end of that latch moves the hook 644 out of its path and then permits that hook to slip under that free end and hold it. The raising of the rod 526 raises the horizontally directed stop portion of rib 528 out of the path of the arrested projection 226 on tank 148, thereby enabling the frictional forces at bevel gear 138 and flanged sleeve 142 to rotate the tank 148 approximately fifty degrees. That rotation will be stopped when the next projection 226 on tank 148 moves into engagement with the rod 230; that rod rising upwardly under the bias of spring 242 when the upward movement of rib 528 lets the arrested projection 226 move off of the top of rod 230. The raising of worm gear 540 by the L-shaped lever 536 causes that gear to engage and drive the worm wheel 634; whereby rotating the shaft 628. The pulling of the rod 546 to the left moves the yoke 560 toward the bar 586. Because the cam follower 584 was not engaged by the "first developer" cam 816, the yoke 560 will be in the position shown in FIG. 24; and when that yoke is in that position it will hold the closure 704 in the position shown by solid lines in FIG. 3. The rotation of the plate 522 moves its lower edge into register with the spring 422 on the L-shaped lever 420 carried by the bracket 414.

As the sleeve 404 continues to move upwardly under the combined action of pin 466 and thread 377, the spring 422 will engage the lower edge of plate 522 and will rock the lever 420 in the counter-clockwise direction, thereby inserting the pin 426 into the reduced diameter neck 385 of shaft 378 and also permitting the latch 432 to rotate to the position of FIG. 21, wherein it holds the pin 426 in inserted position. The sleeve 404 will move a short distance farther upward, and as soon as the rib 406 rises above the stop 614, that stop will move into position under that rib and prevent downward movement of the sleeve 404. About this same time, the upward movement of sleeve 404 brings the right hand arm portion of lever 446 into engagement with the lower end of actuator 396; and that engagement rotates that lever in the counter-clockwise direction, as that lever is viewed in FIG. 32. That rotation shifts the spring 462 to a position where that spring urges the lever 458 to rotate in the counter-clockwise direction and pull the pin 466 out of the thread 377. However, the driving force of the thread 377 on that pin is such that the force of the spring alone can not withdraw the pin 466. Hence, the sleeve 404 will continue to rise upwardly until the upper end of the thread 377, shown in FIG. 59, is reached and thereupon the pin 466 will be pushed out of the thread 377, and the spring 462 will be able to hold it in withdrawn position.

As soon as the pin 466 is forced to its withdrawn position, the sleeve 404 will start to move downwardly; but before it moves down a quarter of an inch, the rib 406 will strike and be held by the stop 614. This downward movement of the sleeve 404 is so short that the pin 426 which was previously inserted into the reduced diameter neck 385 of shaft 378 is still held above the upper end of thread 379.

It will be noted that the tank 148 was not freed for rotation by the rib 528 until the sleeve 404 had almost reached the upper limit of its travel. As a result, the film rack was wholly above the level of the tops of the receptacles 174 before the tank could begin its rotation. In this way, an interlock between the rotation of the tank and the movement of the vertically movable support for the film rack is provided. That interlock prevents breakage of the various parts of the film treating apparatus.

In rotating approximately fifty degrees, the tank 148 shifted the receptacle A to the position which the sleeve occupies in FIG. 3; and hence, the "First Developer" is now directly below the film rack. That film rack will be telescoped down into that "First Developer" when the tripping cam 638 strikes the lower end of the trip 648. The tripping cam 638 is mounted on the shaft 628; and that shaft was set in motion by the worm gear 540 when that gear was raised into engagement with the worm wheel 634 by the upward movement of crank arm 506 and L-shaped lever 536. After a few seconds, the tripping cam strikes the lower end of trip 648, thereby driving the upper end of that trip against the offset 617 in bar 616; thereby forcing the stop 614 out from under the rib 406 on sleeve 404. Immediately, the sleeve 404 will move down until the pin 426 engages the bottom edge of reduced diameter neck 385; and almost immediately the pin 426 will be engaged by the thread 379. The engagement of pin 426 with thread 379 will drive the sleeve 404 downwardly and immerse the film rack in the "First Developer."

As the bottom of the sleeve 404 approaches the collar 400 on the shaft 378, the latch 432 will engage the semi-cylindrical flange 374 on the ring 372; and that engagement will cause that latch to rotate out of engagement with the lower end of the L-shaped lever 420. This enables the helical spring 428 to rotate the lever 420 in the clockwise direction about the pivot 418, and such rotation will withdraw the pin 426 from the thread 379. Thereupon the sleeve 404 will be free to rest on the collar 400.

The worm gear 702 on the reduced diameter portion 381 of shaft 378 engages and drives the worm wheel 710 whenever the sleeve 404 is in its lower position; and in doing so, that gear causes the cutaway bevel gear 712 to rotate. The rotation of the cutaway bevel gear 712 will recurrently rotate the bevel gear 728 for about one half of a revolution and then let the spring 730 return that gear and the shaft 724 to their original position. The resultant oscillation of the film rack in the solutions keeps air bubbles from clinging to the film and keeping the solutions from contacting all portions of the film. The worm gear 702 will, however, move out of engagement with the worm wheel 710 whenever the sleeve 404 moves upwardly. This means that the film rack will not be oscillated when it is not in one of the receptacles 174; and this very desirable because it keeps the oscillation of the film rack from throwing solution around the interior of the cover 790. Further, the pawl 716 prevents undesired rotation of the film rack, as it rises out of one of the receptacles, in the event the sleeve 404 starts upward when the spring 722 is wound up and the bevel gear 728 is about to be freed by the cutaway bevel gear 712.

The engagement beween the "First Developer" cam 816 and the cam followers 288 and 472 thus raised and lowered the sleeve 404 and also rotated the tank 148 about fifty degrees while the sleeve 404 was in elevated position. In doing this, the said cam shifted the film rack from the sleeve 178 to the receptacle A. The upward movement of the film rack did not expose the film held thereby to light because the light-tight cover 790 coacts with the triangular plate 390 and with the tank 148 to exclude all light.

As the sleeve 404 moved downwardly from its uppermost position, the collar 408 thereon permitted the latch 518 to move downwardly; that latch having been freed by the hook 644 when the trip cam 638 struck the trip 648 and rotated the shaft 642 in the counter-clockwise direction. The return of the latch 518 to its initial position permitted the crank arm 506 to lower the push plate 510 out of engagement with the bottom of the rod 526, and permitted the L-shaped lever 536 to let the worm gear 540 drop downwardly away from the worm wheel 634. Furthermore, it permitted the rod 546 to move to the right, as that rod is viewed in FIG. 29.

The film rack and the film held thereby will remain in the "First Developer" in receptacle A, and will be recurrently oscillated, for ten minutes. At the end of that time, cam 830 will engage the arm 582 of cam follower 584 and will also engage the cam follower 472. In striking the arm 582 on the cam follower 584, the cam 830 will rotate that cam in the counter-clockwise direction and will raise the lever 572 upwardly to its intermediate position; that position being the lower dotted line position shown in FIG. 29. As the lever 572 is raised upwardly to its intermediate position it will, through the rod 570, the plate 568 and the pin 566 rock the yoke 560 to a completely horizontal position. In that position, the upper notches 562 of that yoke will be in register with the flanges 588 and 590 of the bar 586. In striking the cam follower 472, the cam 830 will cause the sleeve 404 to move upwardly, much in the manner in which the cam 816 caused that sleeve to move upwardly. However, when the collar 408 engages the projection 520 on latch 518 and causes the rod 546 to move to the left, the notch 562 in the left hand arm of the yoke will engage the flange 590 on the bar 586 and force that bar to rotate the vertical shaft 592 in the clockwise direction in FIGS. 31 and 32. That rotation will continue until the notch 562 in the right hand arm of that yoke engages the flange 588 on bar 586. The overall rotation of the shaft 592 is sufficient to rotate the gear segment 594 far enough to rotate the closure 704 to the middle position shown by dotted lines in FIG. 3. This rotation occurs before the latch 518 reaches its uppermost position, and as that latch continues to its uppermost position the spring 556 will yield.

With the exception that the sleeve 404 was rotated about its vertical axis while it was in elevated position, the upward and downward movement of the sleeve was the same as the upward and downward movement of that sleeve under the actuation of the cam 816. The upward movement of the sleeve 404 occurred while the cam 830 was still in engagement with the arm 582 of the cam follower 584, and hence that cam follower held the yoke 560 in the requisite horizontal position until it engaged and rotated the bar 586. Once the sleeve 404 moves downwardly to release the latch 518, the cam follower 584 can return to normal and let the lever 572 return to its solid line position in FIG. 29 under the action of the weight 574.

The yoke 560 was both rotated and translated during the upward and downward movement of the sleeve 404, and the lever 572 rotated with the shaft 578. Despite this, the rod 570, the plate 568 and the pin 566 maintained a positive and continuous connection between the yoke 560 and the lever 572. In essence, that rod, plate and pin provide a universal joint connection between that yoke and that lever.

The overall result of the engagement between the cam 830 and the cam followers 584 and 472 is that the sleeve 404 raised the film rack out of receptacle A and lowered it into the central area of the tank 148. That central area is filled with fresh water, and that water will provide the requisite rinsing of the film. The film rack and the film will be oscillated while in the wash water, and that oscillation will make sure that all of the "First Developer" is rinsed away. As the sleeve 404 moved downwardly to its lowermost position, the pin 412 on the collar 408 rotated the lever 672 to valve opening position. The opening of that valve will provide a constant addition of fresh wash water as long as the sleeve 404 remains in that position. This addition of fresh wash water minimizes the likelihood of the film or the film rack carrying one solution to the receptacles for other solutions.

The upward movement of the rod 526, when the collar 408 on sleeve 404 rotated the latch 518, did not permit the tank 148 to rotate, because the rod 230 had not been lowered out of the path of the arrested projection 226. The cam 830 was able to elevate and rotate the sleeve 404 without moving the rod 230 because the upper right edge of that cam has been cut away and does not engage the cam 288.

After the film rack and film have been oscillated in the wash water for a minute the "hardening" cam 816 engages and rotates the cam followers 288 and 472. The engagement of that cam with the cam follower 288 will cause the rod 230 to be moved downwardly, as explained above in connection with the "First Developer" cam 816; and that movement will permit the tank 148 to move into engagement with the rib 528 on rod 526. The engagement of the "hardening" cam 816 with the cam follower 472 will cause the sleeve 404 to move upwardly, all as explained above. Because the lower right hand edge of the "Hardener" cam 816 is cut away, that cam will not engage the cam follower 584. Consequently, the weight 574 will hold the lever 572 in the position shown by solid lines in FIG. 29.

As the collar 408 on the sleeve 404 rotates the latch 518 upwardly, that latch will cause the rod 546 to move to the left. The yoke 560 on that rod will be in the position shown in FIG. 24; and in that position the left hand arm of that yoke and the notches therein will be wholly below and out of register with the flange 590 on bar 586 while notch 564 of the right hand arm of that yoke will be in register with the flange 588 on bar 586. As a result, when the rod 546 carries the yoke 560 to the left, the notch 564 in that right hand arm will engage the flange 588 and rotate the bar 586 in the counter-clockwise direction about shaft 592. That rotation will cause the gear segment 594 to rotate the sleeve 404 in the clockwise direction; and in this way the sleeve 404 rotates the closure 704 to the solid line position in FIG. 3.

As the sleeve 404 moved upwardly toward its uppermost position, the crank arm 506 and its push plate 510 raised the rod 526 upwardly. That upward movement raised the horizontal portion of rib 528 out of the path of the arrested projection 226 on the tank 148, thereby freeing the tank for rotation through about fifty degrees. As a result, when the sleeve 404 returned to its lower position, it immersed the film rack and film in the "Hardener" in receptacle B.

The film rack and the film will continue to oscillate in the "Hardener" for seven minutes, and then the cam 826 will engage and rotate cam followers 288, 472 and 584; that cam engaging the arm 580 of cam follower 584. The engagement of cam 826 and the cam follower 288 will cause the rod 230 to be lowered out of the path of the arrested projection 226; and thereupon the tank will rotate until that projection abuts the rib 528 on rod 526. The engagement of cam 826 with the cam follower 472 will cause the sleeve 404 to move upwardly, thereby lifting the film rack out of the "Hardener." The engagement of cam 826 with the arm 580 of cam follower 584 will raise the lever 572 to its uppermost position, thereby shifting the yoke 560 until its left hand arm has the notch 564 thereof in register with flange 590 on bar 586 and its right hand arm is wholly below the level of the flange 588 on that bar. This shifting of yoke 560 enabled the left hand movement of rod 546 to force the bar 586 to rotate to the position shown in FIG. 32; and that rotation rotated the sleeve 404 to the position of FIG. 32. In that position that sleeve holds the closure 704 in the most counter-clockwise position shown in FIG. 3.

As the sleeve 404 moved upwardly, the crank arm 506 and its push plate 510 raised the stop portion of rib 528 out of the path of the arrested projection 226, thereby permitting tank 148 to rotate. Consequently, when that sleeve starts to move downwardly it is in register with the sleeve 178; the latter sleeve having been advanced to the position occupied by receptacle D in FIG. 3. At this time the pressure face on the bottom of the screw 740 will be in register with the rod 208 carried by the tank 148. As a result, that pressure face will engage and depress that rod when the sleeve 404 moves downwardly onto the collar 400. The downward movement of rod 208 will rotate the latch 204 about the pivot 202, thereby freeing the ear 206 on the ring 190 and also closing the switch 278. The spring 198 will rotate the ring 190, with the light-sealing element, out of register with the sleeve 178; and the light from the lamp 812 will "reverse" the film.

The lamp 812 will remain illuminated for one minute until the "wash" cam 830 engages and rotates the cam followers 584 and 472; that cam engaging the arm 582 on cam follower 584. The engagement of cam 830 and cam follower 472 will cause the sleeve 404 to move upwardly in the manner described above. The engagement of cam 830 and the arm 582 on cam follower 584 will cause that cam follower to raise the lever 472 to its intermediate position, thereby making the yoke 560 horizontal. This means that the notch 562 in the right hand arm of the yoke 560 will engage the flange 588 of bar 586, as the rod 546 moves to the left, all as shown in FIG. 32. Further left hand movement of the rod 546 will rotate the bar 586 in the counter-clockwise direction until the notch 562 in the left hand arm of yoke 560 engages the flange 590 on bar 586 and halts that movement. That rotation will be sufficient to rotate the sleeve 404 to the point where it holds the film rack over the central wash area of tank 148. "Wash" cam 830 thus raises the film rack out of sleeve 178 and shifts it into the wash water. Once again as the sleeve 404 moves down into engagement with collar 404, the pin 412 on collar 408 rotates the lever 672 to valve opening position. The bottom of sleeve 178 will remain open, and light will enter tank 148 through that sleeve, but after the "reversing" step, the film is insensitive to light.

The film rack will oscillate in the wash water for three minutes and then cam 838 will engage the cam follower 472. The upper right and the lower right hand edges of cam 838 have been cutaway, and therefore that cam will not engage the cam followers 288 and 584. The engagement of cam 838 and cam followers 472 will start the the sleeve moving upwardly; all as described above. As the rod 456 is pulled to the left, the notch 564 of the right hand arm of the yoke 560 will engage the flange 588 of bar 586, thereby rotating the closure 704 to the position shown by solid lines in FIG. 3. That movement of the closure places the film rack in register with receptacle C; that receptacle having been rotated to the position occupied by sleeve 178 in FIG. 3 by the cam 826. That receptacle is filled with "Color Developer," and the film rack will be oscillated in that solution for fifteen minutes.

Thereafter another cam 830 will shift the film rack into the wash water for five minutes; another cam 816 will rotate the tank 148 and will shift the film rack into the "clearing" solution in receptacle D for five minutes; another cam 830 will shift the film rack into the wash water for a one minute rinse; another cam 816 will rotate the tank 148 and will shift the film rack into the "Bleach" in receptacle E for eight minutes; a cam 834 will rotate tank 148 and shift the film rack into the wash water for one minute; "the fixer" cam 826 will rotate tank 148 and shift the closure 704 to its left hand position in FIG. 3 and thereby place the film rack in receptacle D again for three minutes, that receptacle being in its initial position once again; a cam 834 will rotate tank 148 and shift the film rack into the wash water for eight minutes; the second-to-last cam 826 will rotate tank 148 and shift closure 706 to the left to place the film rack in the "stabilizer" in receptacle F; and the last cam 826 will rotate tank 148 and hold closure 706 to the left and thereby place the film rack in sleeve 178 once again. This will re-illumine the lamp 812, but almost immediately thereafter, the stop 814 will shift the movable contact of switch 806 to its lower position, thereby de-energizing motor 362 and lamp 812 while energizing the blower motor 800.

As the motor 800 starts to rotate, the thread in the outer end of its shaft will release the screw 801, and thereupon the spring incorporated in the hinge 796 will force the door 798 open. The fan 804 will thereupon draw air upwardly through the open lower end of sleeve 178, over and past the film held by the film rack, and then out through the blower housing. That flow of air will quickly dry the film; and that film can then be freed from the film treating apparatus by moving the sleeve 404 upwardly, rotating the flanged sleeve 746 until the vertical portion of L-shaped slot 748 is in register with the pin on sleeve 732, and pulling downwardly on the flanged sleeve 746.

The film treating operations were carried through automatically under the control of the cams on the cam-supporting disc 338. Consequently, the operator did not, and does not, need to remain near the film treating apparatus. All he need do is shift the switch 698 to the "on" position and then come back in about an hour and a quarter to shift the switch 698 to "off" position and remove the film.

The blower 804 is very helpful and convenient, but it is not absolutely essential. If the operator so desires, he can eliminate the blower housing and the motor 800; and in that event, he will merely mount a closure over the opening 194. Where this is done, the operator will remove the film from the film treating apparatus and dry it manually. The blower 804, however, eliminates this handling of the film, and it thereby minimizes the risk of injury to that film. The blower 804 will be able to dry the film without any "water spots" on it, because the oscillation of the film rack, after the last cam 816 has moved that rack into sleeve 178 and before the stop 814 has de-energized the motor 362, will cause the water to run off of that film.

The film treating cycle recommended herein for "Ektachrome" film includes a stabilizing step, but that step can be omitted. In such a case, a cam 834 would be used to shift the film rack out of the "bleach" and into the wash water, a cam 826 would be used to place that film rack in the "fixer," and two cams 834 would be used to rotate the tank 148 twice while holding the film rack in register with the wash water; and a cam 826 would be used to place the film rack in the sleeve 178 again. Once again the lamp 812 would be re-illumined for a short time.

With color film made by Ansco, a different film treating cycle is needed. In that cycle, "First Developer" is in receptacle A, "Short Stop" is in receptacle B, "Hardener" is in receptacle C, "Color Developer" is in receptacle D, "Bleach" is in receptacle E, and "Fixer" is in receptacle F. The film treating sequence recommended by Ansco for its color film requires two immersions in the "Short Stop" and "Hardener"; and the tank 148 will again make more than one revolution during the film treating cycle.

The cycle recommended herein for Ansco color film starts with the closure 704 and the tank 148 in the positions shown in FIG. 3. The first step is initiated by a cam 816 which rotates the tank 148 and places the film rack in receptacle A. After nineteen minutes, a cam 816 rotates the tank 148 and places the film rack in receptacle B. At the end of one minute, a cam 816 rotates tank 148 and places the film rack in receptacle C. After four minutes a cam 830 shifts the film rack into the central wash area. Three minutes later a cam 836 shifts the film rack into the sleeve 178 for the "Second Exposure." After three minutes, a cam 816 rotates tank 148 and shifts the film rack into receptacle D. Sixteen minutes later a cam 826 rotates the tank 148 and shifts the film rack into receptacle B again. At this time, receptacle B occupies the position originally occupied by receptacle D, and the closure 704 will be in its most counter-clockwise position in FIG. 3. After one minute, a cam 826 will rotate tank 148 and place the film rack in receptacle C. That receptacle now occupies the position originally occupied by receptacle D. After four minutes of hardening, a cam 834 moves tank 148 and shifts the film rack into the central wash area for a five minute "wash." At this time, the tank 148 has completed one full revolution. At the conclusion of the "wash" period, a cam 826 moves tank 148 and shifts the film rack into the receptacle E; that receptacle occupying the position originally held by receptacle D. After five minutes a cam 834 advances tank 148 and shifts the film rack into the central wash area for three minutes. The next cam is a cam 836, and it shifts the film rack into receptacle F; that receptacle being in the position originally occupied by the receptacle D. After four minutes a cam 834 rotates tank 148 and shifts the film rack into the central wash area. At this time the sleeve 178 is in the position originally occupied by the receptacle D. A series of steps will be performed in the following ten minutes, and those steps are initiated by three cams 834 set in three of the nine slots of cam-supporting disc 338 following the cam 834 that shifted the film rack from receptacle F to the central wash area. The purpose of the three additional cams 834 is to advance the tank to a point where it is one step short of two complete revolutions. At the end of the tenth minute a final cam 816 will advance the tank 148 and shift the film rack into sleeve 178. The stop 814 closely follows the final cam 816, and that stop will de-energize the motor 362.

The film treating cycle for the Ansco color film could have been terminated by leaving the film rack in the central area for the entire ten minutes of the final "wash," and then using a cam 836 to move the tank 148 and shift the film rack into the sleeve 178. However, that arrangement has the disadvantage of energizing the lamp 812 needlessly.

As indicated above, it is possible, with the film treating apparatus of the present invention, to treat every known film for which instructions and solutions are publicly available. All that needs to be done is to place the various solutions in the appropriate receptacles, and to set the appropriate cams in position on the cam-supporting disc 338. To make the use of the film developing apparatus even more simple and convenient, appropriate instructions can be printed or silk screened onto the exterior of the tank 148. Thus, a number of vertically spaced lines can be formed on the exterior of tank 148, and each line can set forth the recommended arrangement of solutions for a particular film. For example, in the two uppermost lines on that tank the words "Ektachrome" and "Ansco" could be listed adjacent sleeve 178; "First Developer" would be listed in both lines adjacent receptacle A; "Hardener" would be in the top line and "Short Stop" would be in the second line at receptacle B; "Color Developer" would be in the top line and "Hardener" would be in the second line adjacent receptacle C; "Clear" would be in the top line and "Color Developer" would be in the second line at receptacle D; "Bleach" would be in both lines adjacent receptacle E; and "Fixer" would be in both lines at receptacle F. Similar notations would appear in the remaining lines. With such notations, it would be virtually impossible to place a solution in the wrong receptacle.

Cam-supporting discs with the appropriate cams fixedly secured to them can be provided, and each such disc will be plainly marked with the name of the film of which it is intended. In addition, an operator can obtain several slotted cam-supporting discs 338, equip them with the appropriate cams, and use each of those discs for just its own particular film treating cycle. The most economical arrangement, of course, is to shift the cams relative to the one slotted cam-supporting disc.

The operation of the film treating apparatus of the present invention has been described in detail in connection with the treatment of film. That film treating apparatus can, however, be used to develop prints, positives and the like.

At the conclusion of a film treating sequence, the operator can remove the receptacles 174 and pour the solutions back into stoppered containers. This is easily done by grasping the upper ends of those receptacles and rotating them to free the threaded studs on the bottoms thereof from the threaded openings in the bottom of tank 148.

Whereas a preferred embodiment of the present invention has been shown and described in the drawing and accompanying description it should be apparent to those skilled in the art that various changes may be made in the form of the invention without affecting the scope thereof.

What I claim is:

1. An automatic film developing apparatus which comprises a plurality of open-top, individual, solution-containing receptacles, a support for said solution-containing receptacles, said solution-containing receptacles being set adjacent the wall of said support to define a central area, a film rack, a support for said film rack, said film rack being dimensioned to telescope into said solution-containing receptacles and into said central area, a source of motive power that provides vertical and horizontal movement of said film rack and also provides rotation of said support for said solution-containing receptacles, whereby said film rack can be telescoped into the said solution-containing receptacles to immerse the film on said film rack in the solutions in said solution-containing receptacles in progressive sequence or in a sequence including immersions in said central area as well as in said solution-containing receptacles, and a control mechanism that determines the sequence of movements of said film rack and said support for said solution-containing receptacles, said support for said solution-containing receptacles being rotatable about a vertical axis.

2. An automatic film developing apparatus which comprises a plurality of open-top, individual, solution-containing receptacles, a support for said solution-containing receptacles, a film rack, a support for said film rack, said film rack being dimensioned to telescope into said solution-containing receptacles, a source of motive power that provides vertical and horizontal movement of said film rack and also provides rotation of said support for said solution-containing receptacles about a vertical axis, whereby said film rack can be telescoped into the said solution-containing receptcales to immerse the film on said film rack in the solutions in said solution-containing receptacles, a stop that selectively holds said support at different circumferentially spaced positions, said stop and said solution-containing receptacles being arranged so two of said solution-containing receptacles are in position to underlie said film rack in two of its horizontally moved positions, and a control mechanism that determines the sequence of movements of said film rack and said support for said solution-containing receptacles, said support for said film rack being vertically movable to raise said film rack above the level of said solution-containing receptacles and being selectively movable horizontally to dispose said film rack above either of said two solution-containing receptacles.

3. An automatic film developing apparatus which comprises a plurality of open-top, individual, solution-containing receptacles, a support for said solution-containing receptacles, a film rack, a support for said film rack, said film rack being dimensioned to telescope into said solution-containing receptacles, a source of motive power that provides relative vertical and horizontal movement between said film rack and said support for said solution-containing receptacles, whereby said film rack can be telescoped into the said solution-containing receptacles to immerse the film on said film rack in the solutions in said solution-containing receptacles, and a control mechanism that determines the sequence of relative movements of said film rack and said support for said solution-containing receptacles, said support for said solution-containing receptacles being tank-like to accommodate wash water and being circular in plan, said receptacles being disposed adjacent the periphery of said support for said solution-containing receptacles whereby the center of said support for solution-containing receptacles constitutes a well of wash water for the film on said film rack, said support for said film rack being movable horizontally to selectively immerse said film rack in said solutions or in said well of wash water.

4. An automatic film developing apparatus which comprises a plurality of open-top, individual, solution-containing receptacles, a support for said solution-containing receptacles, a film rack, a support for said film rack, said film rack being dimensioned to telescope into said solution-containing receptacles, a source of motive power that provides relative vertical and horizontal movement between said film rack support and said support for said solution-containing receptacles, whereby said film rack can be telescope into the said solution-containing receptacles to immerse the film on said film rack in the solutions in said solution-containing receptacles, an open area in said support for said solution-containing receptacles to accommodate wash water, said support for said film rack being movable horizontally to selectively immerse said film rack in said solutions or in said wash water area, a conduit that is connectible to a source of wash water, and a valve that is intermediate said wash water area and said conduit to regulate the flow of wash water to said area, said valve being adapted to be opened part way to provide a predetermined steady flow of wash water into said wash water area and also being adapted to be opened further to provide a greater flow of wash water into said wash water area whenever the film on said film rack is in said wash water area.

5. An automatic film developing apparatus that comprises a substantially light-tight housing, a vertically directed pivot that is below but is in register with said housing, a support that is mounted on said pivot and that rotates about said pivot, said support having the upper end thereof immediately adjacent and in light-tight relation with said housing, a plurality of receptacles that are mounted on and are rotatable with said support and that can hold different film-treating solutions, said receptacles having the upper ends thereof open, a film rack that is dimensioned to telescope into said receptacles, a vertically movable support that extends into said light-tight housing to support said film rack, said light-tight housing being tall enough to permit said vertically movable support to move to an upper position wherein said film rack is wholly above the level of the open upper ends of said receptacles, and a source of motive power for said vertically movable support and for said support for said receptacles, said support for said receptacles being rotatable about said pivot only when said vertically movable support is in said upper position and is holding said film rack above the level of the open upper ends of said receptacles, said support for said receptacles being circular in plan and having said receptacles disposed adjacent its periphery to define a central wash water area, said vertically movable support being rotatable about a vertical axis to selectively place said film rack in register with a receptacle at one side of said support for said receptacles, to place said film rack in register with another receptacle at the opposite side of said support for said receptacles, or to place said receptacle in register with said central wash water area even though said support for said receptacles should remain stationary.

6. An automatic film developing apparatus which comprises a plurality of open-top, individual, solution-containing receptacles, a support for said solution-containing receptacles, a film rack, a support for said film rack, said film rack being dimensioned to telescope into said solution-containing receptacles, a light-tight housing for said film rack which has a portion separable from said film rack to expose the film on said film rack for immersion in the solutions in said solution-containing receptacles, an opening in said support for said solution-containing receptacles, said portion of said light-tight housing being adapted to automatically close said opening and thereby render said support for said solution-containing receptacles light-tight when said portion of said light-tight housing is separated from said film rack, a source of motive power that provides relative vertical and horizontal movement between said film rack and said support for said solution-containing receptacles, whereby said film rack can be telescoped into the said solution-containing receptacles to immerse the film on said film rack in the solutions in said solution-containing receptacles, and a control mechanism that determines the sequence of movements of said film rack and said support for said solution-containing receptacles.

7. An automatic film developing apparatus which comprises a plurality of open-top, individual, solution-containing receptacles, a support for said solution-containing receptacles, a light-tight cover for said support, a film rack, a support for said film rack, said film rack being dimensioned to telescope into said solution-containing receptacles, a light-tight housing for said film rack which has a portion separable from said film rack to expose the film on said film rack, said light-tight housing for said film rack being assembled with said film rack in darkness and thereafter protecting the film on said film rack until said light-tight housing has been mounted on said support for said solution-containing receptacles and said light-tight cover has been assembled with said support for said solution-containing receptacles, said separable portion of said light-tight housing for said film rack being separated from said film rack to expose the film on said film rack while said film rack is enclosed by said support for said solution-containing receptacles and by said light-tight cover and after said light-tight cover has been assembled with said support for said solution-containing receptacles, a source of motive power that provides relative vertical and horizontal movement between said film rack and said support for said solution-containing receptacles, whereby said film rack can be telescoped into the said solution-containing receptacles to immerse the film on said film rack in the solutions in said solution containing receptacles, and a control mechanism that determines the sequence of movements of said film rack and said support for said solution-containing receptacles.

8. An automatic film developing apparatus which comprises a plurality of open-top, individual, solution-containing receptacles, a support for said solution-containing receptacles, a film rack, a support for said film rack, said film rack being dimensioned to telescope into said solution-containing receptacles, a light-tight housing for said film rack which has a portion separable from said film rack to expose the film on said film rack and which has a second portion separable from said film rack and from the first said portion of said light-tight housing, an opening in said support for said solution-containing receptacles, a tube that is carried by said support for said solution-containing receptacles and that is above and in register with said opening in said support for said solution-containing receptacles, the first said portion of said light-tight housing being a disc that can span and seal said opening in said support for said solution-containing receptacles, said second portion of said light-tight housing being a sleeve that snugly fits within said tube, the first said and said second portions of said light-tight housing initially coacting with the rest of said light-tight housing to enclose and protect film on said film rack but being separable from said film rack to span and seal said opening in said support for said solution-containing receptacles and to expose the film on said film rack for subsequent immersion in the solutions in said solution-containing receptacles while said light-tight housing is disposed within said sleeve, a source of motive power that provides relative vertical and horizontal movement between said film rack and said support for said solution-containing receptacles, whereby said film rack can be telescoped into the said solution-containing receptacles to immerse the film on said film rack in the solutions in said solution-containing receptacles, and a control mechanism that determines the sequence of movements of said film rack and said support for said solution-containing receptacles.

9. Film processing apparatus comprising a number of developing tank means for containing processing chemicals, tank means for containing a rinse, means to movably support said developing tank means in a circle surrounding said rinse tank means, film support means for mounting thereon film for processing, transfer means for moving the film support means alternately from one of the developing tank means to the rinse tank means and to another developing tank means for alternately contacting the film with processing chemicals and rinsing the contacted film, power means for activating the transfer means, and control means for initiating the movement of the support means.

10. Film processing apparatus comprising a number of open-top, individual receptacles for containing processing chemicals, a support for said receptacles, a film rack, a support for said film rack, said film rack being dimensioned to telescope into said receptacles, said support for said receptacles and said support for said film rack being relatively movable along a predetermined path to successively place said film rack in register with said receptacles, said support for said receptacles and said support for said film rack being relatively movable in a direction transverse of said predetermined path, a source of motive power that provides relative vertical movement of said support for said receptacles and of said support for said film rack and that also provides relative movement of said support for said receptacles and of said support for said film rack along said predetermined path and in said transverse direction, whereby said film rack can be telescoped into said receptacles in variable sequences to immerse the film carried by said film rack in various of said processing chemicals in said receptacles, and a control mechanism that determines the sequence of relative movements of said support for said receptacles and of said support for said film rack.

11. Film processing apparatus comprising a number of open-top, individual receptacles for containing processing chemicals, a support for said receptacles, a film rack, a support for said film rack, said film rack being dimensioned to telescope into said receptacles, said support for said receptacles and said support for said film rack being relatively movable along a predetermined path to successively place said film rack in register with said receptacles, said support for said receptacles and said support for said film rack being relatively movable in a direction transverse of said predetermined path, a source of motive power that provides relative vertical movement of said support for said receptacles and of said support for said film rack and that also provides relative movement of said support for said receptacles and of said support for said film rack along said predetermined path and in said transverse direction, whereby said film rack can be telescoped into said receptacles in variable sequences to immerse the film carried by said film rack in various of said processing chemicals in said receptacles, and a control mechanism that determines the sequence of relative movements of said support for said receptacles and of said support for said film rack, and an interlock between said support for said film rack and said support for said receptacles that prevents relative movement between said support for said film rack and said support for said receptacles along said predetermined path or in said transverse direction until said film rack is above the level of the tops of said receptacles.

12. Film processing apparatus comprising a number of open-top, individual receptacles for containing processing chemicals, a support for said receptacles, a film rack, a support for said film rack, said film rack being dimensioned to telescope into said receptacles, said support for said receptacles and said support for said film rack being relatively movable to successively place said film rack in register with said receptacles, a source of motive power that provides relative vertical movement of said support for said receptacles and of said support for said film rack and that also provides relative horizontal movement of said support for said receptacles and of said support for said film rack, whereby said film rack can be telescoped into said receptacles to immerse the film carried by said film rack in said processing chemicals in said receptacles, and a shaft that is carried by said support for said film rack and that is connectable to and separable from a shaft driven by said source of motive power, said shafts being connected and thereby agitating said film rack whenever said support for said film rack telescopes said film rack into one of said receptacles, said shafts being separated and hereby permitting said film rack to come to rest whenever said support for said film rack raises said film rack above the level of the tops of said receptacles.

13. Film processing apparatus comprising a number of open-top, individual receptacles for containing processing chemicals, a support for said receptacles, a film rack, a support for said film rack, said film rack being dimensioned to telescope into said receptacles, said support for said receptacles and said support for said film rack being relatively movable along a predetermined path to successively place said film rack in register with said receptacles, said support for said receptacles and said support for said film rack being relatively movable in a direction transverse of said predetermined path, a source of motive power that provides relative vertical movement of said support for said receptacles and of said support for said film rack and that also provides relative movement of said support for said receptacles and of said support for said film rack along said predetermined path and in said transverse direction, whereby said film rack can be telescoped into said receptacles in variable sequences to immerse the film carried by said film rack in various of said processing chemicals in said receptacles, and a control mechanism that determines the sequence of relative movements of said support for said receptacles and of said support for said film rack, said control mechanism including a timer that can be set to vary the proportions of the overall time cycle of said apparatus which said film rack spends in said receptacles, said source of motive power including a variable speed electric motor, whereby said apparatus can vary the proportions of the overall time cycle of said apparatus which said film rack spends in said receptacles while maintaining said overall time cycle fixed or can vary the proportions of the overall time cycle of said apparatus which said film rack spends in said receptacles while also varying said overall time cycle or can maintain said proportions of the overall time cycle of said apparatus which said film rack spends in said receptacles fixed while maintaining said overall time cycle fixed or can maintain said proportions of the overall time cycle of said apparatus which said film rack spends in said receptacles fixed while varying said overall time cycle.

14. Film processing apparatus comprising a number of open-top, individual receptacles for containing processing chemicals, a support for said receptacles, a film rack, a support for said film rack, said film rack being dimensioned to telescope into said receptacles, said support for said receptacles and said support for said film rack being relatively movable to successively place said film rack in register with said receptacles, a source of motive power that provides relative vertical movement of said support for said receptacles and of said support for said film rack and that also provides relative horizontal movement of said support for said receptacles and of said support for said film rack, whereby said film rack can be telescoped into said receptacles to immerse the film carried by said film rack in said processing chemicals in said receptacles, a shaft that is carried by said support for said film rack and that is connectable to and separable from a shaft driven by said source of motive power, a spring that biases said film rack to an initial position, and an element that responds to rotation of the first said shaft to recurrently overcome the bias of said spring and to rotate said film rack a predetermined number of degrees and then releases said film rack so said spring can return said film rack to said initial position, said shafts being connected together and thereby causing said element and said spring to agitate said film rack whenever said support for said film rack telescopes said film rack into one of said receptacles, said shafts being separated and thereby permitting said film rack to come to rest whenever said support for said film rack raises said film rack above the level of the tops of said receptacles.

15. Film processing apparatus comprising a number of open-top, individual receptacles for containing processing chemicals, a support for said receptacles, a pivot for said support for said receptacles, a film rack, a support for said film rack, said support for said receptacles being rotatable about said pivot to move said receptacles through a circular path of movement that extends through a position in which said support for said film rack can hold said film rack, said support for said film rack having a vertical axis and being reciprocable along said axis, said film rack being dimensioned to telescope into said film receptacles, said support for said film rack being rotatable about said axis to move said film rack into and out of said position and also into and out of another position through which said circular path extends, a source of motive power that rotates said support for said receptacles about said pivot and that also reciprocates said support along said axis and that additionally causes said support for said film rack to move said film rack into and out of the first said and said second positions, and a control mechanism that determines the sequence of movements of said support for said receptacles and of said support for said film rack, said source of motive power being adapted to move said film rack into and out of the first said and said second positions while said support for said receptacles is held against rotation relative to said pivot.

16. Film processing apparatus comprising a substantially light-tight housing, an opening in the bottom of said housing, a door adjacent said opening, a number of open-top, individual receptacles for containing processing chemicals, a support for said receptacles, a film rack, a support for said film rack, said film rack being dimensioned to telescope within said receptacles, said support for said receptacles and said support for said film rack being relatively movable to successively place said film rack in register with said receptacles, a source of motive power that provides relative vertical movement of said support for said receptacles and of said support for said film rack and that also provides relative horizontal movement of said support for said receptacles and of said support for said film rack, whereby said film rack can be telescoped into said receptacles to immerse the film carried by said film rack in said processing chemicals in said receptacles, said source of motive power also providing movement of said support for said receptacles and of said support for said film rack to move said film rack into and out of register with said door, and a light-tight enclosure for said film rack which has a separable bottom that can be held by and rotated with said door, said light-tight enclosure for said film rack being adapted to protect film carried by said film rack until said film rack is disposed within said light-tight housing, said bottom of said light-tight enclosure for said film rack being separable from said light-tight enclosure and being movable into engagement with said door to enable said processing solutions and light to contact said film carried by said film rack, and said door subsequently being openable to reverse said film.

17. Film processing apparatus comprising a substantially light-tight housing, an opening in the bottom of said housing, a door adjacent said opening, a number of open-top, individual receptacles for containing processing chemicals, a support for said receptacles, a film rack, a support for said film rack, said film rack being dimensioned to telescope within said receptacles, said support for said receptacles and said support for said film rack being relatively movable to successively place said film rack in register with said receptacles, a source of motive power that provides relative vertical movement of said support for said receptacles and of said support for said film rack and that also provides relative horizontal movement of said support for said receptacles and of said support for said film rack, whereby said film rack can be telescoped into said receptacles to immerse the film carried by said film rack in said processing chemicals in said receptacles, a blower housing in communication with said light-tight housing, a blower within said blower housing, said blower normally being inactive and said door normally being closed but said door being openable to admit air into said light-tight housing and said blower being actuatable to draw said air inwardly through said opening and through said light-tight housing to dry film carried by said film rack.

18. Film processing apparatus comprising a substantially light-tight housing, an opening in the bottom of said housing, a door adjacent said opening, a number of open-top, individual receptacles for containing processing chemicals, a support for said receptacles, a film rack, a support for said film rack, said film rack being dimensioned to telescope within said receptacles, said support for said receptacles and said support for said film rack being relatively movable to successively place said film rack in register with said receptacles, a source of motive power that provides relative vertical movement of said support for said receptacles and of said support for said film rack and that also provides relative horizontal movement of said support for said receptacles and of said support for said film rack, whereby said film rack can be telescoped into said receptacles to immerse the film carried by said film rack in said processing chemicals in said receptacles, a blower housing in communication with said light-tight housing, a blower within said blower housing, said blower normally being inactive and said door normally being closed but said door being openable to admit air into said light-tight housing and said blower being actuatable to draw said air inwardly through said opening and through said light-tight housing to dry film carried by said film rack, said blower housing having an openable closure therefor, said blower having a thread on the rotor shaft thereof, said closure having a complementary thread thereon, said threads normally holding said closure in closed position but responding to rotation of said rotor to release said closure.

19. Film processing apparatus comprising a number of open-top, individual receptacles for containing processing chemicals, a support for said receptacles, a film rack, a support for said film rack, said film rack being dimensioned to telescope into said receptacles, said support for said receptacles and said support for said film rack being relatively movable along a predetermined path to successively place said film rack in register with said receptacles, said support for said receptacles and said support for said film rack being relatively movable in a direction transverse of said predetermined path, a source of motive power that provides relative vertical movement of said support for said receptacles and of said support for said film rack and that also provides relative movement of said support for said receptacles and of said support for said film rack along said predetermined path and in said transverse direction, whereby said film rack can be telescoped into said receptacles in variable sequences to immerse the film carried by said film rack in various of said processing chemicals in said receptacles, and a control mechanism that determines the sequence of relative movements of said support for said receptacles and of said support for said film rack, said control mechanism including a cam-supporting element and a plurality of cams of different shapes mounted and carried by said cam-supporting element, some of said cams causing said source of motive power to provide said relative vertical movement of said support for said receptacles and of said support for said film rack, other of said cams causing said source of motive power to provide said relative movement of said support for said receptacles and of said support for said film rack along said predetermined path.

20. Film processing apparatus comprising a number of developing tank means for containing processing chemicals, tank means for containing a rinse, means to movably support said developing tank means in a circle surrounding said rinse tank means, film support means for mounting thereon film for processing, transfer means for moving the film support means alternately from one of the developing tank means to the rinse tank means and to another developing tank means for alternately contacting the film with processing chemicals and rinsing the contacted film, power means for activating the transfer means, and control means for initiating the movement of the support means, said developing tank means being disposed within said rinse tank means, said power means including a screw with a helical thread and a follower that engages and is driven by said thread on said screw.

21. Film processing apparatus comprising a number of developing tank means for containing processing chemicals, tank means for containing a rinse, means to movably support said developing tank means in a circle surrounding said rinse tank means, film support means for mounting thereon film for processing, transfer means for moving the film support means alternately from one of the developing tank means to the rinse tank means and to another developing tank means for alternately contacting the film with processing chemicals and rinsing the contacted film, power means for activating the transfer means, and control means for initiating the movement of the support means, said transfer means including a linkage that can provide positive mechanical movement of said film support means from said one developing tank means to said rinse tank means and back from said rinse tank means to said one tank developing means.

References Cited in the file of this patent

UNITED STATES PATENTS

| | | |
|---|---|---|
| 1,795,167 | Gross | Mar. 3, 1931 |
| 2,183,742 | Hershberg | Dec. 19, 1939 |
| 2,325,120 | Forse | July 27, 1943 |
| 2,380,378 | Allen | July 31, 1945 |
| 2,544,644 | Allen | Mar. 13, 1951 |
| 2,559,921 | Aiello et al. | July 10, 1951 |
| 2,585,945 | Laing | Feb. 19, 1952 |